(12) United States Patent
Liu et al.

(10) Patent No.: US 11,991,085 B2
(45) Date of Patent: May 21, 2024

(54) DATA PACKET MARKING METHOD AND DEVICE, AND DATA TRANSMISSION SYSTEM

(71) Applicant: Huawei Technologies Co., Ltd., Guangdong (CN)

(72) Inventors: Dawei Liu, Beijing (CN); Nongda Hu, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 189 days.

(21) Appl. No.: 17/492,395

(22) Filed: Oct. 1, 2021

(65) Prior Publication Data

US 2022/0045960 A1 Feb. 10, 2022

Related U.S. Application Data

(63) Continuation of application No. PCT/CN2020/083193, filed on Apr. 3, 2020.

(30) Foreign Application Priority Data

Apr. 4, 2019 (CN) .......................... 201910271733.1
Apr. 26, 2019 (CN) .......................... 201910345779.3

(51) Int. Cl.
*H04L 47/31* (2022.01)
*H04L 12/26* (2006.01)
(Continued)

(52) U.S. Cl.
CPC ........ *H04L 47/2483* (2013.01); *H04L 43/026* (2013.01); *H04L 47/11* (2013.01); *H04L 47/2425* (2013.01); *H04L 47/621* (2013.01)

(58) Field of Classification Search
CPC . H04L 41/142; H04L 43/026; H04L 43/0876; H04L 43/0894; H04L 43/16;
(Continued)

(56) References Cited

U.S. PATENT DOCUMENTS

2004/0071086 A1* 4/2004 Haumont ............. H04Q 3/0091
370/328
2008/0298248 A1* 12/2008 Roeck .................... H04L 47/10
370/237
(Continued)

FOREIGN PATENT DOCUMENTS

CN       104272680 A    1/2015
CN       105827540 A    8/2016
(Continued)

OTHER PUBLICATIONS

Zhou Pan et al:Flow-aware explicitcongestion notification for datacenternetworks Cluster Computing, Baltzer SciencePublishers Bussum, NL,vol. 22 No. 4 Feb. 26, 2019 (Feb. 26, 2019) pp. 1431 1446 XP036920434.

*Primary Examiner* — Awet Haile
(74) *Attorney, Agent, or Firm* — WOMBLE BOND DICKINSON (US) LLP

(57) ABSTRACT

This application discloses: collecting statistics about a target parameter of a first data flow, where a target queue of a switching device is used to buffer a data packet in at least one data flow, the first data flow is one of the at least one data flow, and the target parameter is used to reflect an amount of data in the first data flow; when a length of the target queue meets a first length condition, determining, based on at least one of the target parameter and an auxiliary parameter of the first data flow, a marking probability corresponding to the first data flow; and performing congestion marking on a data packet in the first data flow based on the marking probability corresponding to the first data flow.

17 Claims, 12 Drawing Sheets

(51) Int. Cl.
*H04L 12/801* (2013.01)
*H04L 12/863* (2013.01)
*H04L 43/026* (2022.01)
*H04L 47/11* (2022.01)
*H04L 47/2425* (2022.01)
*H04L 47/2483* (2022.01)
*H04L 47/62* (2022.01)

(58) Field of Classification Search
CPC ..... H04L 47/11; H04L 47/12; H04L 47/2425; H04L 47/2483; H04L 47/25; H04L 47/31; H04L 47/33; H04L 47/621; H04L 47/6255; H04L 49/501
See application file for complete search history.

(56) References Cited

U.S. PATENT DOCUMENTS

| | | | |
|---|---|---|---|
| 2009/0190486 A1 | 7/2009 | Lavigne et al. | |
| 2012/0127860 A1* | 5/2012 | Arumilli | H04L 47/6215 370/235 |
| 2015/0092591 A1* | 4/2015 | Matthews | H04L 43/062 370/253 |
| 2015/0271081 A1* | 9/2015 | Arumilli | H04L 47/32 370/235 |
| 2017/0272372 A1 | 9/2017 | Gafni | |
| 2017/0339062 A1* | 11/2017 | Mayer-Wolf | H04L 47/29 |
| 2020/0162384 A1* | 5/2020 | Lee | H04L 47/2483 |

FOREIGN PATENT DOCUMENTS

| | | |
|---|---|---|
| CN | 108449279 A | 8/2018 |
| CN | 109391558 A | 2/2019 |

\* cited by examiner

DATA PACKET MARKING METHOD AND DEVICE, AND DATA TRANSMISSION SYSTEM

CROSS-REFERENCE TO RELATED APPLICATIONS

This application is a continuation of International Application No. PCT/CN2020/083193, filed on Apr. 3, 2020, which claims priority to Chinese Patent Application No. 201910271733.1, filed on Apr. 4, 2019 and to Chinese Patent Application No. 201910345779.3, filed on Apr. 26, 2019, the disclosures of each of the aforementioned patent applications are hereby incorporated by reference in their entireties.

TECHNICAL FIELD

This application relates to the field of communications technologies, and in particular, to a data packet marking method and device, and a data transmission system.

BACKGROUND

A data transmission system includes a switching device, an upstream device of the switching device, and a downstream device of the switching device. The upstream device may send a data flow to the downstream device by using the switching device, to transmit data.

The switching device may receive the data flow sent by the upstream device, may buffer a data packet in a first data flow into a transmit queue in the switching device, and send the data packet in the transmit queue to the downstream device. It should be noted that the switching device detects a length of the transmit queue. When the length of the transmit queue is greater than a length threshold, the switching device may perform explicit congestion notification (ECN) marking on a data packet in each data flow in the transmit queue. When receiving the data flow on which ECN marking is performed, the downstream device indicates the upstream device to reduce a sending rate of the data flow in which the data flow on which ECN marking is performed is located.

When the length of the transmit queue is greater than the length threshold, the switching device may perform ECN marking on a data packet in each data flow in the transmit queue. Therefore, a rate at which the upstream device sends each data flow is reduced, and consequently a delay of each data flow is relatively high.

SUMMARY

This application provides a data packet marking method and device, and a data transmission system, to resolve a problem that a delay of each data flow is relatively high. The technical solutions are as follows:

In some embodiments (sometimes referred to as, "a first aspect"), a data packet marking method is provided, and is applied to a switching device. The method includes: collecting statistics about a target parameter of a first data flow, where a target queue of the switching device is used to buffer a data packet in at least one data flow, the first data flow is one of the at least one data flow, and the target parameter is used to reflect an amount of data in the first data flow; when a length of the target queue meets a first length condition, determining (e.g., identifying, defining, measuring), based on at least one of the target parameter and an auxiliary parameter of the first data flow, a marking probability corresponding to the first data flow, where the auxiliary parameter of the first data flow is related to the target parameter of the first data flow; and/or performing (e.g., executing, implementing) congestion marking on a data packet in the first data flow based on the marking probability corresponding to the first data flow.

When the switching device determines that the length of the target queue meets the first length condition, it indicates that the target queue is relatively long. In this case, the switching device may determine, based on at least one of the target parameter and/or the auxiliary parameter of the first data flow, the marking probability corresponding to the first data flow, to perform congestion marking on the data packet in the first data flow based on at least one of the target parameter and/or the auxiliary parameter of the first data flow, and to reduce a probability of performing congestion marking on all data flows, so that transmission efficiency of all the data flows can be prevented from being reduced, and a delay caused to all the data flows can be avoided.

In some embodiments, the auxiliary parameter includes a level of the first data flow. In some embodiments, the auxiliary parameter may include another parameter that is different from a level of the first data flow and that is related to the target parameter of the first data flow.

In some embodiments, the determining, based on at least one of the target parameter and/or an auxiliary parameter of the first data flow, a marking probability corresponding to the first data flow includes: determining, based on the target parameter of the first data flow, the marking probability corresponding to the first data flow, where when a marking probability determined based on a second target parameter is greater than a marking probability determined based on a first target parameter, the second target parameter is greater than the first target parameter. To be specific, when the marking probability corresponding to the first data flow is determined, a relatively proper marking probability may be determined based on only the target parameter of the first data flow.

In some embodiments, the determining, based on at least one of the target parameter and/or an auxiliary parameter of the first data flow, a marking probability corresponding to the first data flow includes: determining, based on the level of the first data flow, the marking probability corresponding to the first data flow, where when a marking probability determined based on a second flow level is greater than a marking probability determined based on a first flow level, the second flow level is greater than the first flow level. To be specific, when the marking probability corresponding to the first data flow is determined, a relatively proper marking probability may be determined based on only the level of the first data flow.

In some embodiments, the determining, based on at least one of the target parameter and/or an auxiliary parameter of the first data flow, a marking probability corresponding to the first data flow includes: determining, based on the target parameter and/or the level of the first data flow, the marking probability corresponding to the first data flow, where when the level of the first data flow remains unchanged, the marking probability corresponding to the first data flow increases as the target parameter of the first data flow increases, or the marking probability corresponding to the first data flow remains unchanged as the target parameter of the first data flow increases. To be specific, when the marking probability corresponding to the first data flow is determined, a relatively proper marking probability may be determined based on both the target parameter of the first data flow and/or the level of the first data flow.

In some embodiments, when a second flow level related to a second target parameter is greater than a first flow level related to a first target parameter, the second target parameter is greater than the first target parameter. To be specific, a higher data flow level indicates a larger target parameter related to the data flow level. However, when one target parameter is greater than another target parameter, a data flow level related to the one target parameter is not necessarily greater than a data flow level related to the another target parameter.

In some embodiments, the target parameter of the first data flow falls within one of a plurality of target parameter ranges, the plurality of target parameter ranges are in a one-to-one correspondence with a plurality of data flow levels, and/or the level of the first data flow is a data flow level that is in the plurality of data flow levels and/or that corresponds to the one target parameter range.

In some embodiments, the determining, based on at least one of the target parameter and/or an auxiliary parameter of the first data flow, a marking probability corresponding to the first data flow includes: determining, based on at least one of the target parameter and/or the level of the first data flow and at least one of the length and a level of the target queue, the marking probability corresponding to the first data flow, where the level of the target queue is related to the length of the target queue. To be specific, when the marking probability corresponding to the first data flow is determined, a relatively proper marking probability may be determined based on both at least one of the target parameter and/or the level of the first data flow and at least one of the length and the level of the target queue.

In some embodiments, the determining, based on at least one of the target parameter and the level of the first data flow and at least one of the length and a level of the target queue, the marking probability corresponding to the first data flow includes: determining, based on the level of the first data flow and the level of the target queue, the marking probability corresponding to the first data flow, where if the level of the first data flow remains unchanged, when a marking probability determined based on a second queue length is greater than a marking probability determined based on a first queue length, the second queue length is greater than the first queue length. To be specific, when the marking probability corresponding to the first data flow is determined, a relatively proper marking probability may be determined based on both the level of the first data flow and the length of the target queue.

In some embodiments, the determining, based on at least one of the target parameter and the level of the first data flow and at least one of the length and a level of the target queue, the marking probability corresponding to the first data flow includes: determining, based on the level of the first data flow and the level of the target queue, the marking probability corresponding to the first data flow, where if the level of the first data flow remains unchanged, when a marking probability determined based on a second queue level is greater than a marking probability determined based on a first queue level, the second queue level is greater than the first queue level. To be specific, when the marking probability corresponding to the first data flow is determined, a relatively proper marking probability may be determined based on both the level of the first data flow and the level of the target queue.

In some embodiments, the determining, based on at least one of the target parameter and the level of the first data flow and at least one of the length and a level of the target queue, the marking probability corresponding to the first data flow includes: determining, based on the target parameter and the level of the first data flow and the length and the level of the target queue, the marking probability corresponding to the first data flow, where when both the level of the first data flow and the level of the target queue remain unchanged, a relationship between the marking probability corresponding to the first data flow, the target parameter of the first data flow, and the length of the target queue meets at least one of the following: if the target parameter of the first data flow remains unchanged, the marking probability corresponding to the first data flow increases as the length of the target queue increases; if the length of the target queue remains unchanged, the marking probability corresponding to the first data flow increases as the target parameter of the first data flow increases; if the target parameter of the first data flow remains unchanged, the marking probability corresponding to the first data flow remains unchanged as the length of the target queue increases; and if the length of the target queue remains unchanged, the marking probability corresponding to the first data flow remains unchanged as the target parameter of the first data flow increases.

To be specific, when the marking probability corresponding to the first data flow is determined, a relatively proper marking probability may be determined based on the target parameter and the level of the first data flow and the length and the level of the target queue.

In some embodiments, when a second queue level related to a second queue length is greater than a first queue level related to a first queue length, the second queue length is greater than the first queue length. To be specific, a higher queue level indicates a longer queue length related to the queue level.

In some embodiments, the length of the target queue falls within one of a plurality of length ranges, the plurality of length ranges are in a one-to-one correspondence with a plurality of queue levels, and the level of the target queue is a queue level that is in the plurality of queue levels and that corresponds to the one length range.

In some embodiments, the determining, based on at least one of the target parameter and an auxiliary parameter of the first data flow, a marking probability corresponding to the first data flow includes: determining, based on at least one of the target parameter and the level of the first data flow and at least one of a transmission rate of the first data flow and a transmission rate level of the first data flow, the marking probability corresponding to the first data flow, where the transmission rate level of the first data flow is related to the transmission rate of the first data flow. To be specific, when the marking probability corresponding to the first data flow is determined, a relatively proper marking probability may be determined based on both at least one of the target parameter and the level of the first data flow and at least one of the transmission rate of the first data flow and the transmission rate level of the first data flow.

In some embodiments, the determining, based on at least one of the target parameter and the level of the first data flow and at least one of a transmission rate of the first data flow and a transmission rate level of the first data flow, the marking probability corresponding to the first data flow includes: determining, based on the target parameter of the first data flow and the transmission rate of the first data flow, the marking probability corresponding to the first data flow, where if the target parameter of the first data flow remains unchanged, when a marking probability determined based on a second transmission rate is greater than a marking probability determined based on a first transmission rate, the second transmission rate is greater than the first transmission rate. To be specific, when the marking probability corresponding to the first data flow is determined, a relatively proper marking probability may be determined based on both the target parameter of the first data flow and the transmission rate of the first data flow.

In some embodiments, the determining, based on at least one of the target parameter and the level of the first data flow and at least one of a transmission rate of the first data flow and a transmission rate level of the first data flow, the marking probability corresponding to the first data flow includes: determining, based on the level of the first data flow and the transmission rate level of the first data flow, the marking probability corresponding to the first data flow, where if the level of the first data flow remains unchanged, when a marking probability determined based on a second transmission rate level is greater than a marking probability determined based on a first transmission rate level, the second transmission rate level is greater than the first transmission rate level. To be specific, when the marking probability corresponding to the first data flow is determined, a relatively proper marking probability may be determined based on both the level of the first data flow and the transmission rate level of the first data flow.

In some embodiments, the determining, based on at least one of the target parameter and the level of the first data flow and at least one of a transmission rate of the first data flow and a transmission rate level of the first data flow, the marking probability corresponding to the first data flow includes: determining, based on the target parameter and the level of the first data flow, the transmission rate of the first data flow, and the transmission rate level of the first data flow, the marking probability corresponding to the first data flow. To be specific, when the marking probability corresponding to the first data flow is determined, a relatively proper marking probability may be determined based on the target parameter and the level of the first data flow, the transmission rate of the first data flow, and the transmission rate level of the first data flow.

When both the level of the first data flow and the transmission rate level of the first data flow remain unchanged, a relationship between the marking probability corresponding to the first data flow, the target parameter of the first data flow, and the transmission rate of the first data flow meets at least one of the following: if the target parameter of the first data flow remains unchanged, the marking probability corresponding to the first data flow increases as the transmission rate of the first data flow increases; if the transmission rate of the first data flow remains unchanged, the marking probability corresponding to the first data flow increases as the target parameter of the first data flow increases; if the target parameter of the first data flow remains unchanged, the marking probability corresponding to the first data flow remains unchanged as the transmission rate of the first data flow increases; and if the transmission rate of the first data flow remains unchanged, the marking probability corresponding to the first data flow remains unchanged as the target parameter of the first data flow increases.

In some embodiments, the determining, based on at least one of the target parameter and the level of the first data flow and at least one of the length and a level of the target queue, the marking probability corresponding to the first data flow includes: determining, based on at least one of the target parameter and the level of the first data flow, at least one of the length and the level of the target queue, and at least one of a transmission rate of the first data flow and a transmission rate level of the first data flow, the marking probability corresponding to the first data flow, where the level of the target queue is related to the length of the target queue, and the transmission rate level of the first data flow is related to the transmission rate of the first data flow. To be specific, when the marking probability corresponding to the first data flow is determined, a relatively proper marking probability may be determined based on at least one of the target parameter and the level of the first data flow, at least one of the length and the level of the target queue, and at least one of the transmission rate of the first data flow and the transmission rate level of the first data flow.

In some embodiments, the determining, based on at least one of the target parameter and the level of the first data flow, at least one of the length and the level of the target queue, and at least one of a transmission rate of the first data flow and a transmission rate level of the first data flow, the marking probability corresponding to the first data flow includes: determining, based on the target parameter of the first data flow, the length of the target queue, and the transmission rate of the first data flow, the marking probability corresponding to the first data flow. To be specific, when the marking probability corresponding to the first data flow is determined, a relatively proper marking probability may be determined based on the target parameter of the first data flow, the length of the target queue, and the transmission rate of the first data flow.

If both the target parameter of the first data flow and the length of the target queue remain unchanged, when a marking probability determined based on a second transmission rate is greater than a marking probability determined based on a first transmission rate, the second transmission rate is greater than the first transmission rate; and if both the target parameter of the first data flow and the transmission rate of the first data flow remain unchanged, when a marking probability determined based on a second queue length is greater than a marking probability determined based on a first queue length, the second queue length is greater than the first queue length.

In some embodiments, the determining, based on at least one of the target parameter and the level of the first data flow, at least one of the length and the level of the target queue, and at least one of a transmission rate of the first data flow and a transmission rate level of the first data flow, the marking probability corresponding to the first data flow includes: determining, based on the level of the first data flow, the level of the target queue, and the transmission rate level of the first data flow, the marking probability corresponding to the first data flow. To be specific, when the marking probability corresponding to the first data flow is determined, a relatively proper marking probability may be determined based on the level of the first data flow, the level of the target queue, and the transmission rate level of the first data flow. If both the level of the first data flow and the level of the target queue remain unchanged, when a marking probability determined based on a second transmission rate level is greater than a marking probability determined based on a first transmission rate level, the second transmission rate level is greater than the first transmission rate level; and if both the level of the first data flow and the transmission rate level of the first data flow remain unchanged, when a marking probability determined based on a second queue level is greater than a marking probability determined based on a first queue level, the second queue level is greater than the first queue level.

In some embodiments, the determining, based on at least one of the target parameter and the level of the first data flow, at least one of the length and the level of the target queue, and at least one of a transmission rate of the first data flow and a transmission rate level of the first data flow, the marking probability corresponding to the first data flow includes: determining, based on the target parameter and the level of the first data flow, the length and the level of the target queue, the transmission rate of the first data flow, and the transmission rate level of the first data flow, the marking probability corresponding to the first data flow. To be specific, when the marking probability corresponding to the first data flow is determined, a relatively proper marking probability may be determined based on the target parameter and the level of the first data flow, the length and the level of the target queue, the transmission rate of the first data flow, and the transmission rate level of the first data flow.

When the level of the first data flow, the level of the target queue, and the transmission rate level of the first data flow all remain unchanged, a relationship between the marking probability corresponding to the first data flow, the length of the target queue, the target parameter of the first data flow, and the transmission rate of the first data flow meets at least one of the following: if the target parameter of the first data flow and the length of the target queue remain unchanged, the marking probability corresponding to the first data flow increases as the transmission rate of the first data flow increases; if the target parameter of the first data flow and the transmission rate of the first data flow remain unchanged, the marking probability corresponding to the first data flow increases as the length of the target queue increases; if the transmission rate of the first data flow and the length of the target queue remain unchanged, the marking probability corresponding to the first data flow increases as the target parameter of the first data flow increases; if the target parameter of the first data flow and the length of the target queue remain unchanged, the marking probability corresponding to the first data flow remains unchanged as the transmission rate of the first data flow increases; if the target parameter of the first data flow and the transmission rate of the first data flow remain unchanged, the marking probability corresponding to the first data flow remains unchanged as the length of the target queue increases; and if the transmission rate of the first data flow and the length of the target queue remain unchanged, the marking probability corresponding to the first data flow remains unchanged as the target parameter of the first data flow increases.

In some embodiments, when the second transmission rate level is greater than the first transmission rate level, the second transmission rate level is greater than the first transmission rate level. To be specific, a higher transmission rate level indicates a higher transmission rate related to the transmission rate level.

In some embodiments, the transmission rate of the first data flow falls within one of a plurality of transmission rate ranges, the plurality of transmission rate ranges are in a one-to-one correspondence with a plurality of transmission rate levels, and the transmission rate level of the first data flow is a transmission rate level that is in the plurality of transmission rate levels and that corresponds to the one transmission rate range.

In some embodiments, the determining, based on at least one of the target parameter and an auxiliary parameter of the first data flow, a marking probability corresponding to the first data flow includes: when the first data flow meets a marking condition, determining, based on at least one of the target parameter and the auxiliary parameter of the first data flow, the marking probability corresponding to the first data flow. In a case of determining performed based on the marking condition, congestion marking may not be performed on the data packet in the first data flow in some cases in which the marking condition is met, to reduce a delay of the first data flow.

In some embodiments, the marking condition includes: the level of the first data flow does not belong to q lower levels in a plurality of specified data flow levels, where $q \geq 1$. When the marking condition is met, it indicates that the amount of the data in the first data flow is relatively small, and the first data flow is not a data flow that causes congestion on the switching device. In this case, the first data flow does not need to be marked, to reduce a delay of the first data flow.

In some embodiments, the marking condition includes: the transmission rate of the first data flow is greater than a transmission rate threshold, and the transmission rate threshold is a constant or a variable. When the marking condition is met, it indicates that the transmission rate of the first data flow is relatively low, and the first data flow is not a data flow that causes congestion on the switching device. In this case, the first data flow does not need to be marked, to reduce a delay of the first data flow.

In some embodiments, the target parameter includes a quantity of bytes or a quantity of data packets.

In some embodiments (sometimes referred to as, "a second aspect"), a data packet marking method is provided, and is applied to a switching device. The method includes: collecting statistics about a target parameter of a first data flow, where a target queue of the switching device is used to buffer a data packet in at least one data flow, the first data flow is any one of the at least one data flow, the target queue includes a receive (e.g., retrieve, obtain, acquire) queue or a transmit queue, and the target parameter is used to reflect an amount of data in the first data flow; and when a length of the target queue meets a first length condition, determining, based on the target parameter of the first data flow, whether the first data flow meets a marking condition, where the first length condition includes: the length of the target queue is greater than a first length threshold, a target parameter of a data flow that meets the marking condition is greater than a first target parameter threshold, and the first length threshold and the first target parameter threshold each are greater than 0, and when the first data flow meets the marking condition, performing explicit congestion notification ECN marking on at least one data packet in the first data flow; or when the first data flow does not meet the marking condition, skipping performing ECN marking on each data packet in the first data flow.

When the switching device determines that the first data flow meets the marking condition, it indicates that the target queue is relatively long, and a data flow that causes congestion on the switching device includes the first data flow. In this case, the switching device needs to perform ECN marking on the data packet in the first data flow, to reduce a transmission rate of the first data flow, eliminate congestion on the switching device, and improve transmission efficiency of another data flow. In some embodiments, when the switching device determines that the first data flow does not meet the marking condition, it indicates that although the entire target queue is relatively long, a data flow that causes congestion on the switching device does not include the first data flow. In this case, the switching device does not need to perform ECN marking on the data packet in the first data flow. In this way, when the length of the target queue is relatively long, ECN marking can be prevented from being performed on a data flow with a relatively small amount of data, and therefore transmission efficiency of the data flow with the relatively small amount of data is not reduced, and a delay is not caused to the data flow with the relatively small amount of data.

In some embodiments, the target parameter includes a quantity of bytes, and the first target parameter threshold includes a byte quantity threshold. In some embodiments, the target parameter includes a quantity of data packets, and the first target parameter threshold includes a data packet quantity threshold. In this embodiment of this application, only an example in which the target parameter is the quantity of bytes or the quantity of data packets is used. In some embodiments, the target parameter may be another parameter related to a data amount. This is not limited in this embodiment of this application.

In some embodiments, the first length condition includes: the length of the target queue is less than or equal to a second length threshold, and the second length threshold is less than infinity. To be specific, only when the length of the target queue is greater than the first length threshold and less than or equal to the second length threshold, it can be determined that the length of the target queue meets the first length condition.

In some embodiments, before the determining whether the first data flow meets a marking condition, the method includes: when the length of the target queue meets the first length condition, determining a level of the first data flow in a plurality of data flow levels based on the target parameter of the first data flow, where the level of the data flow is positively correlated with the target parameter of the data flow, and the marking condition includes: the level of the data flow is a non-lowest level in the plurality of data flow levels. In this embodiment of this application, the marking condition is set as a condition related to the level of the data flow. In this way, whether the data flow meets the marking condition may be determined by determining whether the level of the data flow is the non-lowest level in the plurality of data flow levels.

In some embodiments, the determining a level of the first data flow in a plurality of data flow levels based on the target parameter of the first data flow includes: determining the level of the first data flow based on the target parameter of the first data flow and a one-to-one correspondence between m+1 target parameter ranges and the plurality of data flow levels, where m≥1, the m+1 target parameter ranges are obtained through division based on m target parameter thresholds, a minimum target parameter threshold in the m target parameter thresholds is the first target parameter threshold, and a data flow level corresponding to the target parameter range is positively correlated with a target parameter in the target parameter range. It should be noted that in this embodiment of this application, for example, the m+1 target parameter ranges are in a one-to-one correspondence with the plurality of data flow levels. In some embodiments, the m+1 target parameter ranges may correspond to q data flow levels, and q is less than m+1 (e.g., at least two target parameter ranges correspond to a same data flow level).

In some embodiments, the performing explicit congestion notification ECN marking on at least one data packet in the first data flow includes: determining a marking probability corresponding to the first data flow, where the marking probability corresponding to the data flow is positively correlated with the level of the data flow; and performing ECN marking on the at least one data packet in the first data flow based on the marking probability corresponding to the first data flow.

A higher level of the first data flow indicates a larger amount of data in the first data flow. In this case, a degree of association between the first data flow and transmission congestion is higher, and ECN marking needs to be performed on more data packets in the first data flow, to greatly reduce a transmission rate of the first data flow, further reduce the length of the target queue, and relieve congestion on the switching device.

In some embodiments, before the performing ECN marking on a data packet in the first data flow, the method includes: when the first data flow meets the marking condition, determining, from n+1 length ranges, a target length range within which the length of the target queue falls, where n≥1, the n+1 length ranges are obtained through division based on n length thresholds, a minimum length threshold in the n length thresholds is the first length threshold, and a maximum length threshold in the n length thresholds is the second length threshold; and the marking probability corresponding to the data flow is positively correlated with the length in the target length range.

A longer length in the target length range indicates a longer length of the target queue. In this case, ECN marking needs to be performed on more data packets in the first data flow, to greatly reduce a transmission rate of the first data flow, further reduce the length of the target queue, and relieve congestion on the switching device.

In some embodiments, the determining a marking probability corresponding to the first data flow includes: determining, according to a first formula, the level of the first data flow, and the target length range, the marking probability corresponding to the first data flow, where the first formula includes: $P(j,i)=P(j-1,i)+Q(i,j)*(L-L_j)/(L_{j+1}-L_j)$. Herein, $L_j$ represents a $j^{th}$ length threshold arranged in ascending order of the n length thresholds, where $1 \le j \le n$; $L_{j+1}$ represents a $(j+1)^{th}$ length threshold arranged in ascending order of the n length thresholds; L represents the length of the target queue; $P(j,i)$ represents a marking probability corresponding to an $i^{th}$ level of data flow in the at least one data flow when L falls within $(L_j, L_{j+1}]$, where $1 \le i \le m+1$; when $j-1>0$, $P(j-1, i)$ represents a marking probability corresponding to the $i^{th}$ level of data flow in the at least one data flow when L falls within $(L_{j-1}, L_j]$; when $j-1=0$, $P(j-1,i)=0$; $Q(i, j)$ represents a marking coefficient of the $i^{th}$ level of data flow when L falls within $(L_1, L_{j+1}]$; and $Q(1, j)=0$, and $$\sum_{j=1}^{n} Q(i, j) \le 1.$$

In some embodiments, the marking condition includes: a transmission rate of the data flow is greater than fair bandwidth, and the fair bandwidth is positively correlated with bandwidth of a target port. When the target queue is the transmit queue, the transmission rate is a rate at which the switching device sends (e.g., transmits, provides, delivers) the data flow, and the target port is a transmit port that is in the switching device and that is used to send a data packet buffered into the target queue. When the target queue is the receive queue, the transmission rate is a rate at which the switching device receives the data flow, and the target port is a receive port that is in the switching device and that is used to receive a data packet buffered into the target queue.

When the switching device determines that the first data flow does not meet the marking condition, it indicates that although the entire target queue is relatively long, most data in the target queue is not data in the first data flow (and/or the first data flow occupies a relatively small amount of bandwidth of the target port). Therefore, a data flow that causes congestion on the switching device does not include the first data flow. In this case, the switching device does not need to perform ECN marking on the data packet in the first data flow. In this way, when the length of the target queue is relatively long, ECN marking can be prevented from being performed on a data flow with a relatively small amount of data, and therefore transmission efficiency of the data flow with the relatively small amount of data is not reduced, and a delay is not caused to the data flow with the relatively small amount of data.

In some embodiments, the fair bandwidth is negatively correlated with a target quantity. The target quantity is a quantity of data flows whose levels belong to a level set in the at least one data flow, the level set includes p higher levels in the plurality of data flow levels, and the level of the data flow is positively correlated with the target parameter of the data flow, where $1 \leq p$.

In some embodiments, the fair bandwidth is equal to a ratio of the bandwidth of the target port to the target quantity.

In some embodiments, the method includes: when the length of the target queue meets a second length condition, performing ECN marking on each data packet in the first data flow, where the second length condition includes: the length of the target queue is greater than the second length threshold.

When the length of the target queue is greater than the second length threshold, it indicates that the length of the target queue is about to reach an upper length limit. In this case, the switching device needs to perform ECN marking on each data packet in each data flow, to quickly reduce a transmission rate of each data flow, further quickly reduce the length of the target queue, and avoid a data packet loss.

In some embodiments (sometimes referred to as, "a third aspect"), a data packet marking device is provided, and is applied to a switching device. The data packet marking device includes modules configured to perform the data packet marking method according to the first aspect or the second aspect.

In some embodiments (sometimes referred to as, "a fourth aspect"), a data packet marking device is provided. The data packet marking device includes at least one processor, at least one port, a memory, and at least one communications bus, and the processor is configured to execute a program stored in the memory, to implement the data packet marking method according to the first aspect or the second aspect.

In some embodiments (sometimes referred to as, "a fifth aspect"), a data transmission system is provided. The data transmission system includes a switching device, and the switching device includes the data packet marking device according to the third aspect or the data packet marking device according to the fourth aspect.

In some embodiments (sometimes referred to as, "a sixth aspect"), a computer-readable storage medium is provided. The computer-readable storage medium stores instructions, and when the computer-readable storage medium runs on a computer, the computer is enabled to perform the data packet marking method according to the first aspect or the second aspect.

In some embodiments (sometimes referred to as, "a seventh aspect"), a computer program product including instructions is provided. When the computer program product runs on a computer, the computer is enabled to perform the data packet marking method according to the first aspect or the second aspect.

DESCRIPTION OF EMBODIMENTS

To make the objectives, technical solutions, and advantages of this application clearer, the following further describes implementations of this application in detail with reference to the accompanying drawings.

Figure 1:
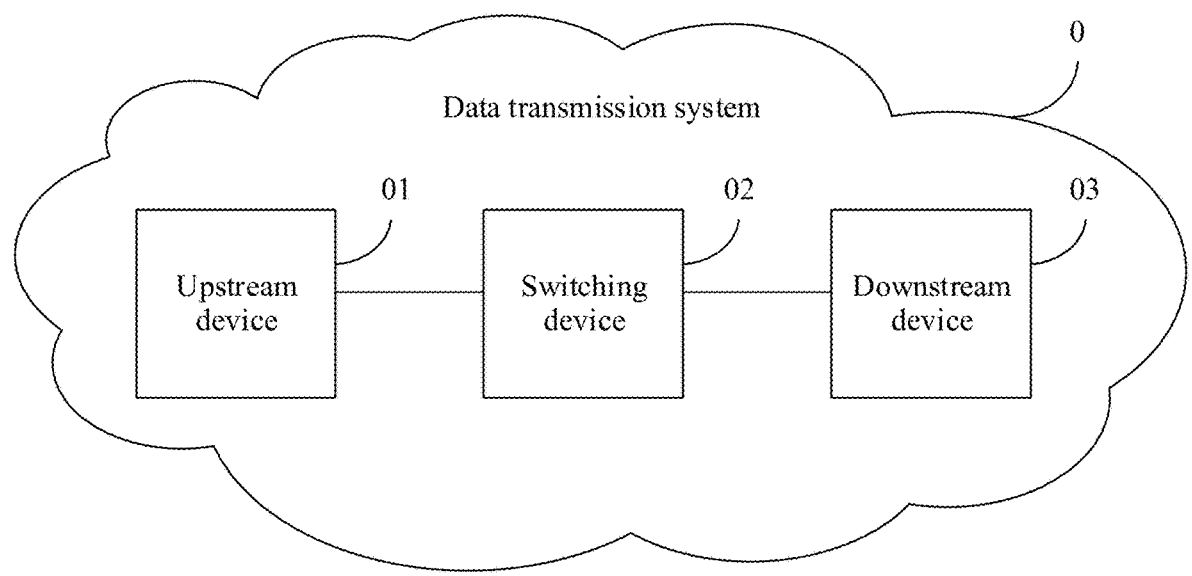
FIG. 1 is a schematic structural diagram of a data transmission system according to an embodiment of this application.

FIG. 1 is a schematic structural diagram of a data transmission system according to an embodiment of this application. As shown in FIG. 1, the data transmission system 0 may include an upstream device 01, at least one switching device 02, and a downstream device 03. The upstream device 01 establishes a communication connection to the downstream device 03 by using the at least one switching device 02.

It should be noted that in FIG. 1, only an example in which the data transmission system 0 includes one switching device 02 is used. In some embodiments, the data transmission system 0 may include a plurality of switching devices 02. In this case, a data flow received by each switching device 02 comes from an upstream device of the switching device 02, and a data flow sent by the switching device 02 flows to a downstream device of the switching device 02. This is not limited in this embodiment of this application.

The upstream device 01 may be a device having a data sending function, such as user equipment, a server, a server cluster, or a base station. The downstream device 03 may be a device having a data receiving function, such as user equipment, a server, a server cluster, or a base station. The switching device 02 may be a device having a data forwarding function, such as a switch, a gateway, a server, or a server cluster.

Figure 2:
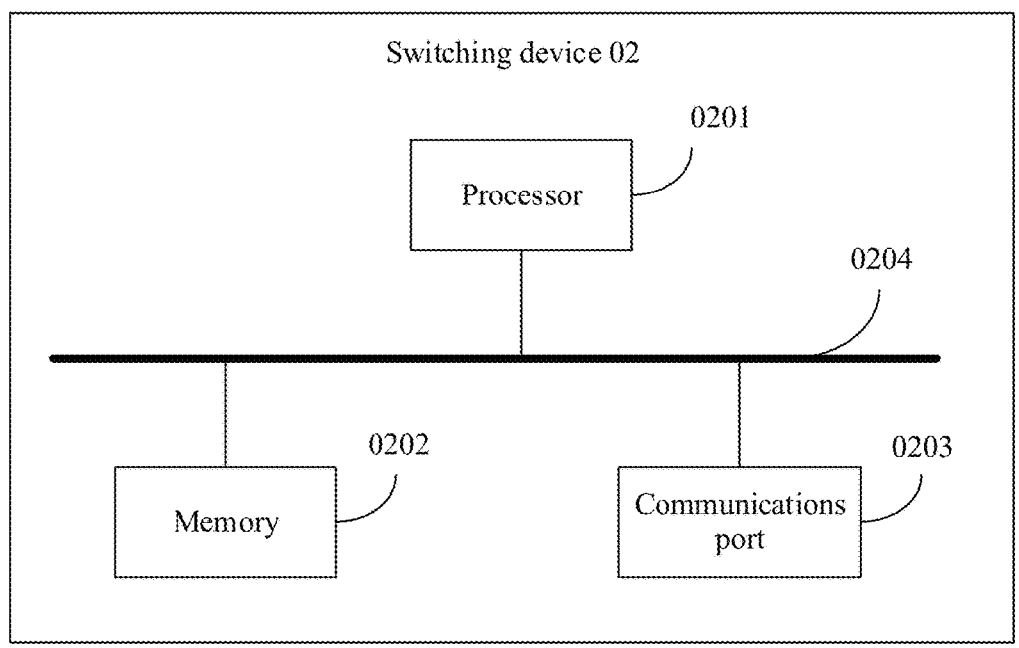
FIG. 2 is a schematic structural diagram of a switching device according to an embodiment of this application.

For example, FIG. 2 is a schematic structural diagram of a switching device according to an embodiment of this application. As shown in FIG. 2, the switching device 02 may include a processor 0201, a memory 0202, a communications port 0203, and a bus 0204. The processor 0201, the memory 0202, and the communications port 0203 are communicatively connected through the bus 0204. The communications port 0203 is configured to communicate with another device under control of the processor 0201. In some implementations, the memory 0202 stores a program 0205, and the program 0205 can be executed by the processor 0201 to implement a data packet marking method provided in an embodiment of this application.

Figure 3:
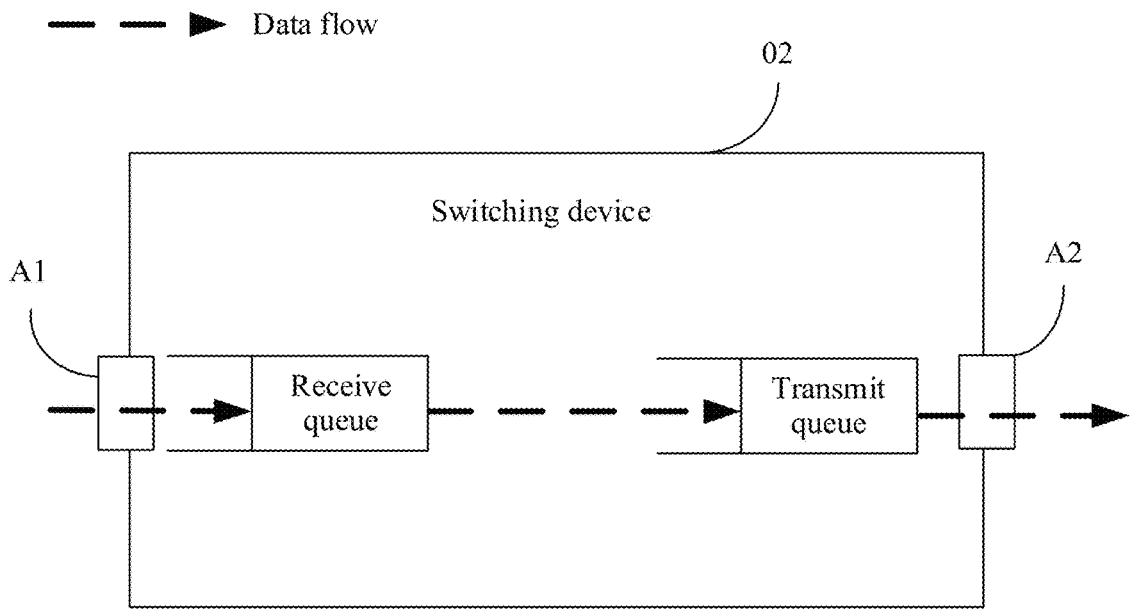
FIG. 3 is a schematic partial structural diagram of a switching device according to an embodiment of this application.

Further, FIG. 3 is a schematic partial structural diagram of a switching device according to an embodiment of this application. As shown in FIG. 3, a communications port of each switching device 02 may include at least one receive port A1 and/or at least one transmit port A2. In FIG. 3, for example, the communications port includes one receive port A1 and one transmit port A2. In some embodiments, the communications port may include only a receive port or a transmit port. In some embodiments, when the communications port includes only the receive port, the data transmission system in FIG. 1 may include only an upstream device, but does not include a downstream device. When the communications port includes only the transmit port, the data transmission system in FIG. 1 may include only a downstream device, but does not include an upstream device. This is not limited in this embodiment of this application.

The switching device 02 may communicate with the upstream device (for example, receive a data flow sent by the upstream device) through the receive port A1, and communicate with the downstream device (for example, send a data flow to the downstream device) through the transmit port A2. Each receive port A1 of the switching device 02 corresponds to one receive queue, and each transmit port A2 of the switching device 02 corresponds to one transmit queue. After receiving a data flow, each switching device 02 may first buffer the data flow in the receive queue. In some embodiments, the switching device 02 needs to select a transmit port A2 from the at least one transmit port A2 of the switching device 02, and buffer a data packet in a first data flow into a transmit queue corresponding to the transmit port A2. When sending a data flow to a downstream device from each transmit port A2, the switching device 02 may send a data packet in a first data flow in a transmit queue corresponding to the transmit port A2.

In a related technology, the switching device detects a length of the transmit queue (e.g., a quantity of bytes in the transmit queue). When the length of the transmit queue is greater than a length threshold, the switching device may perform ECN marking on at least some data packets in each data flow in the transmit queue. Therefore, a rate at which the upstream device sends each data flow is reduced, and consequently a delay of each data flow is relatively high. An embodiment of this application provides a data packet marking method. The method does not cause a relatively high delay of each data flow.

Figure 4:
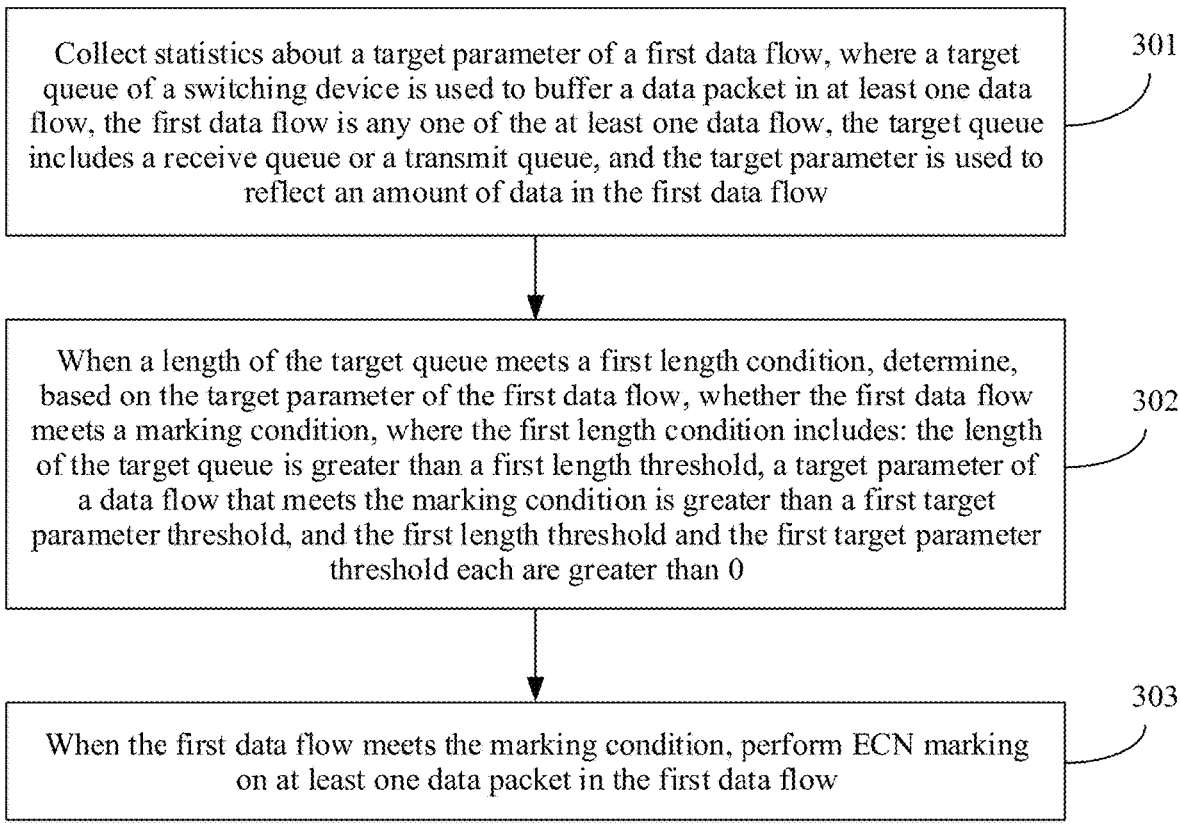
FIG. 4 is a flowchart of a data packet marking method according to an embodiment of this application.

For example, FIG. 4 is a flowchart of a data packet marking method according to an embodiment of this application. The method may be applied to the switching device 02 in the data transmission system shown in FIG. 1. As shown in FIG. 4, the data packet marking method may include the following operations.

Operation 301: Collect statistics about a target parameter of a first data flow, where a target queue of the switching device is used to buffer a data packet in at least one data flow, the first data flow is any one of the at least one data flow, the target queue includes a receive queue or a transmit queue, and the target parameter is used to reflect an amount of data in the first data flow.

It should be noted that when the switching device includes a receive port and a transmit port, the target queue may include the receive queue or the transmit queue. When the switching device includes only a receive port, the target queue includes the receive queue. When the switching device includes only a transmit port, the target queue includes the transmit queue. In some embodiments, the switching device may include other queues, for example, a flow queue, a user queue, and a group queue, in addition to the transmit queue and the receive queue. The target queue in this embodiment of this application may be any other queue different from the transmit queue and the receive queue in the switching device. This is not limited in this embodiment of this application.

The target parameter of the first data flow may be used to reflect the amount of the data in the first data flow. For example, the target parameter of the first data flow may be a quantity of bytes in the first data flow or a quantity of data packets in the first data flow. In some embodiments, the target parameter of the first data flow may be another parameter of the first data flow. This is not limited in this embodiment of this application.

The target queue is used to buffer the data packet in the at least one data flow, and the first data flow is the any one of the at least one data flow (the first data flow may be a specific data flow in the at least one data flow). It should be noted that the first data flow may include at least one data packet, and each data packet may be buffered into the target queue, or each data packet may be deleted from the target queue. In operation 301, the switching device needs to collect statistics about the target parameter of the first data flow based on all data packets in the first data flow. To be specific, the switching device needs to collect statistics about the target parameter of the first data flow based on a data packet that is in the first data flow and that is not buffered into the target queue, a data packet buffered into the target queue, and a data packet deleted from the target queue.

Operation 302: When a length of the target queue meets a first length condition, determine, based on the target parameter of the first data flow, whether the first data flow meets a marking condition, where the first length condition includes: the length of the target queue is greater than a first length threshold, a target parameter of a data flow that meets the marking condition is greater than a first target parameter threshold, and the first length threshold and the first target parameter threshold each are greater than 0.

The switching device may detect the length of the target queue in real time or at intervals. When detecting that the length of the target queue meets the first length condition, the switching device may perform, based on the target parameter that is of the first data flow and that is obtained through statistics collection in operation 301, the operation of determining whether the first data flow meets the marking condition.

In this embodiment of this application, for example, the first length condition includes: the length of the target queue is greater than the first length threshold. In some embodiments, the first length condition may include: the length of the target queue is greater than or equal to the first length threshold.

Operation 303: When the first data flow meets the marking condition, perform ECN marking on the at least one data packet in the first data flow.

When the length of the target queue is greater than the first length threshold, it indicates that there are a relatively large quantity of data packets in the target queue, and data transmission congestion occurs on the switching device. In some embodiments, in this case, the length of the target queue is about to reach an upper length limit. If the data packet continues being transmitted at a current rate, a data packet loss may occur. Therefore, when the length of the target queue is greater than the first length threshold, if the first data flow meets the marking condition, it indicates that the entire target queue is relatively long, and a data flow that causes congestion on the switching device includes the first data flow. In this case, the switching device needs to perform ECN marking on the at least one data packet in the first data flow, to reduce a transmission rate of the first data flow, eliminate congestion on the switching device, and improve transmission efficiency of another data flow.

If the first data flow does not meet the marking condition, it indicates that although the entire target queue is relatively long, there is a relatively small amount of data in the first data flow, and most data in the target queue is not data in the first data flow. Therefore, a data flow that causes congestion on the switching device does not include the first data flow. Therefore, in this case, the switching device needs to perform ECN marking on the data packet in the first data flow. In this way, when the length of the target queue is relatively long, ECN marking can be prevented from being performed on a data flow with a relatively small amount of data, and therefore transmission efficiency of the data flow (which may be referred to as a mice flow) with the relatively small amount of data is not reduced, and a delay is not caused to the data flow with the relatively small amount of data.

In conclusion, in the data packet marking method provided in this embodiment of this application, when the switching device determines that the first data flow meets the marking condition, it indicates that the target queue is relatively long, and most data in the target queue is data in the first data flow. Therefore, a data flow that causes congestion on the switching device includes the first data flow. In this case, the switching device needs to perform ECN marking on the data packet in the first data flow, to reduce a transmission rate of the first data flow, eliminate congestion on the switching device, and improve transmission efficiency of another data flow. In some embodiments, when the switching device determines that the first data flow does not meet the marking condition, it indicates that although the entire target queue is relatively long, most data in the target queue is not data in the first data flow. Therefore, a data flow that causes congestion on the switching device does not include the first data flow. In this case, the switching device needs to perform ECN marking on the data packet in the first data flow. In this way, when the length of the target queue is relatively long, ECN marking can be prevented from being performed on a data flow with a relatively small amount of data, and therefore transmission efficiency of the data flow with the relatively small amount of data is not reduced, and a delay is not caused to the data flow with the relatively small amount of data.

Figure 5:
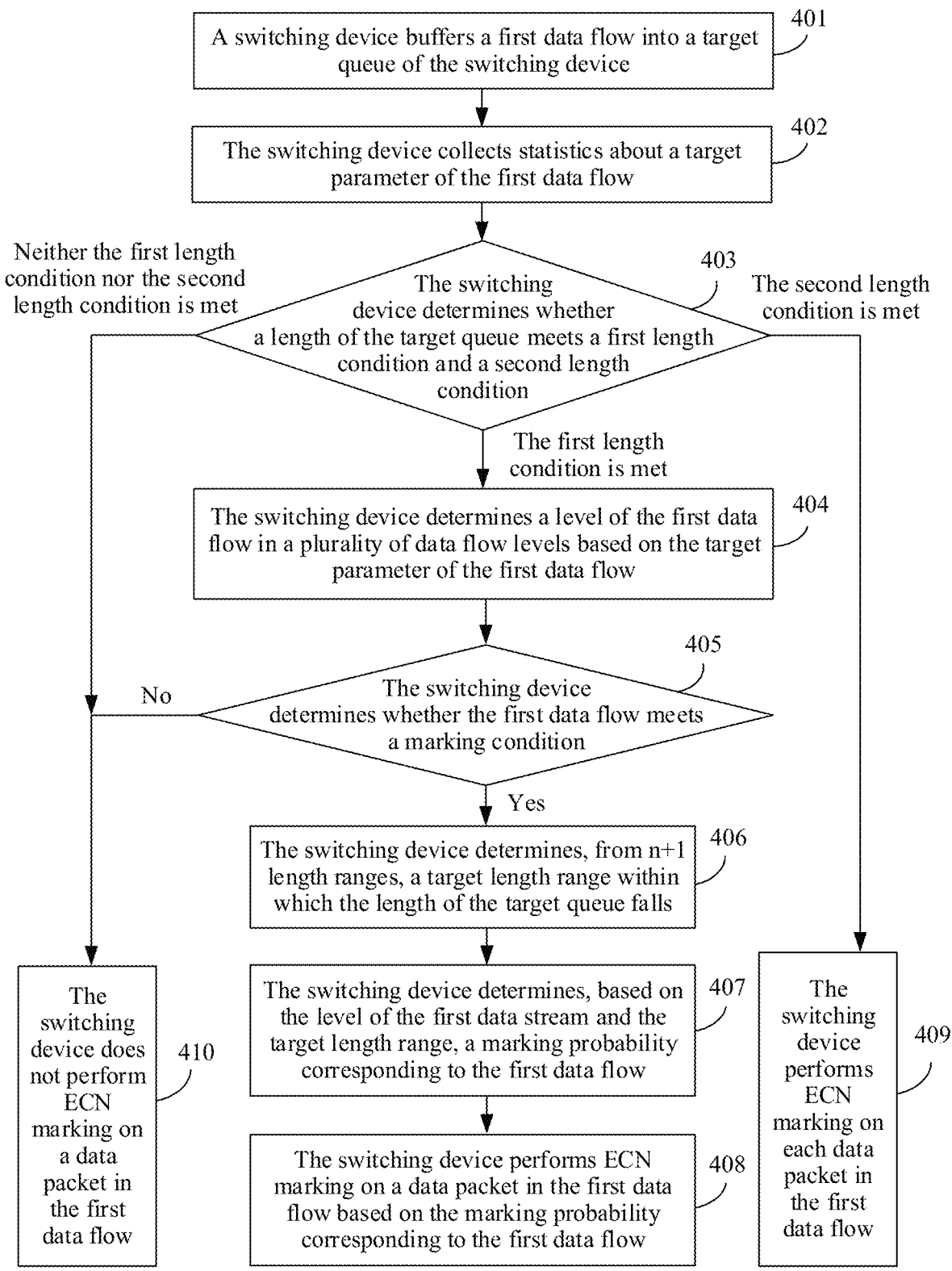
FIG. 5 is a flowchart of another data packet marking method according to an embodiment of this application.

For example, FIG. 5 is a flowchart of another data packet marking method according to an embodiment of this application. The method may be applied to the switching device 02 in the data transmission system shown in FIG. 1. As shown in FIG. 5, the data packet marking method may include the following operations.

Operation 401: The switching device buffers a first data flow into a target queue of the switching device.

For example, the target queue in operation 401 may be any queue (for example, a receive queue or a transmit queue) in the switching device. In some embodiments, the switching device may include other queues, for example, a flow queue, a user queue, and a group queue, in addition to the transmit queue and the receive queue. The target queue in this embodiment of this application may be any other queue different from the transmit queue and the receive queue in the switching device. This is not limited in this embodiment of this application.

As a quantity of data packets buffered into the target queue by the switching device increases, a length of the target queue gradually increases. It should be noted that the target queue has an upper length limit. When the length of the target queue reaches the upper length limit, if the switching device still buffers a data packet into the target queue, the data packet is lost. Therefore, in this embodiment of this application, the switching device needs to monitor the length of the target queue, to avoid a data packet loss.

In some embodiments, the data flow received by the switching device may include a data flow in which the data packet is buffered into another queue, in addition to the first data flow in which the data packet is buffered into the target queue. This is not limited in this embodiment of this application.

Operation 402: The switching device collects statistics about a target parameter of the first data flow.

For operation 402, refer to the explanations of operation 301 in the embodiment shown in FIG. 4. Details are not described herein in this embodiment of this application.

Operation 403: The switching device determines whether the length of the target queue meets a first length condition and a second length condition. When the length of the target queue meets the first length condition, the switching device performs operation 404. When the length of the target queue meets the second length condition, the switching device performs operation 409. When the length of the target queue meets neither the first length condition nor the second length condition, the switching device performs operation 410.

For example, the first length condition may include: the length of the target queue is greater than a first length threshold and less than or equal to a second length threshold. The second length condition may include: the length of the target queue is greater than the second length threshold. The first length threshold is greater than 0, and the second length threshold is less than infinity.

In some embodiments, the first length condition may include: the length of the target queue is greater than or equal to a first length threshold and less than a second length threshold. The second length condition may include: the length of the target queue is greater than or equal to the second length threshold. The first length threshold is greater than 0, and the second length threshold is less than infinity. In this application, the length condition may be adjusted based on a requirement (for example, "greater than" in the length condition is changed to "greater than or equal to", "less than" in the length condition is changed to "less than or equal to", "greater than or equal to" in the length condition is changed to "greater than", or "less than or equal to" in the length condition is changed to "less than"). This is not limited in this embodiment of this application.

In some embodiments, the switching device may prestore n length thresholds, where the n length thresholds are different from each other, and n≥1. In some embodiments, a minimum length threshold in the n length thresholds is the first length threshold, and a maximum length threshold in the n length thresholds is the second length threshold. The first length threshold is greater than 0, and the second length threshold is less than infinity. For example, the n length thresholds may include 100 kilobytes and 300 kilobytes. In this case, the first length threshold is 100 kilobytes, and the second length threshold is 300 kilobytes. For another example, the n length thresholds may include 100 kilobytes, 300 kilobytes, and 500 kilobytes. In this case, the first length threshold is 100 kilobytes, and the second length threshold is 500 kilobytes.

The switching device may determine the length of the target queue in real time or at intervals, and each time determining the length of the target queue, may perform operation 403 based on the length of the target queue. For example, each time determining the length of the target queue, the switching device may compare the length of the target queue with the first length threshold, to determine a value relationship between the length of the target queue and the first length threshold. Each time determining the length of the target queue, the switching device may compare the length of the target queue with the second length threshold, to determine a value relationship between the length of the target queue and the second length threshold.

When the length of the target queue is greater than the first length threshold (for example, the length of the target queue is greater than the first length threshold and less than or equal to the second length threshold, or the length of the target queue is greater than the second length threshold), it indicates that there are a relatively large quantity of data packets in the target queue, and data transmission congestion occurs on the switching device. In some embodiments, in this case, the length of the target queue is about to reach an upper length limit. If the data packet continues being transmitted at a current rate, a data packet loss may occur. Therefore, when the length of the target queue is greater than the first length threshold, the switching device determines that the length of the target queue meets the first length condition or the second length condition, and therefore needs to perform operation 404 to operation 408, or perform operation 409, to perform ECN marking on data packets that are in at least some data flows and that need to be transmitted by the switching device. When the length of the target queue is less than or equal to the first length threshold, the switching device determines that the length of the target queue does not meet the first length condition or the second length condition. In this case, it indicates that there are a relatively small quantity of data packets in the target queue, and data transmission congestion does not occur on the switching device. Therefore, the switching device may perform operation 410, and does not need to perform ECN marking on a data packet in the data flow.

It should be noted that in this embodiment of this application, for example, the first length condition includes: the length of the target queue is greater than the first length threshold and less than or equal to the second length threshold. In some embodiments, the first length condition may include: the length of the target queue is greater than the first length threshold. In this case, in operation 403, the switching device does not need to determine whether the length of the target queue meets the second length condition. In some embodiments, when determining that the length of the target queue meets the first length condition, the switching device performs operation 404.

Operation 404: The switching device determines a level of the first data flow in a plurality of data flow levels based on the target parameter of the first data flow.

In this embodiment of this application, the level of the data flow is related to the target parameter of the data flow. For example, assuming that a first target parameter is greater than a second target parameter, a second flow level related to the second target parameter may be greater than a first flow level related to the first target parameter. In some embodiments, a second flow level related to the second target parameter may be less than a first flow level related to the first target parameter. This is not limited in this embodiment of this application.

After determining the target parameter of the first data flow, the switching device may determine the level of the first data flow based on the target parameter of the first data flow. It should be noted that operation 404 may be implemented in a plurality of manners. The following uses three of the example implementations as an example for description.

In a first example implementation of operation 404, the switching device may substitute the target parameter of the first data flow into a preset formula, to obtain the level of the first data flow in the plurality of data flow levels. An input of the preset formula is the target parameter of the data flow, and an output of the preset formula is the level of the first data flow in the plurality of data flow levels.

In a second example implementation of operation 404, the target parameter of the first data flow falls within one of a plurality of target parameter ranges, the plurality of target parameter ranges are in a one-to-one correspondence with the plurality of data flow levels, and the level of the first data flow may be a data flow level that is in the plurality of data flow levels and that corresponds to the one target parameter range (e.g., a target parameter range within which the target parameter of the first data flow falls).

For example, the switching device may determine the level of the first data flow based on the target parameter of the first data flow and a one-to-one correspondence between m+1 target parameter ranges and the plurality of data flow levels.

The switching device may store m target parameter thresholds, where a minimum target parameter threshold in the m target parameter thresholds is a first target parameter threshold, and m≥1. The switching device may store m+1 target parameter ranges obtained through division based on the m target parameter thresholds, and a one-to-one correspondence between the m+1 target parameter ranges and the plurality of data flow levels. A higher data flow level corresponding to the target parameter range indicates a larger target parameter in the target parameter range.

Assuming that the m target parameter thresholds include 2 megabytes and 5 megabytes, the first target parameter threshold is 2 megabytes, and the m+1 target parameter ranges obtained through division based on the m target parameter thresholds are respectively (0 megabytes, 2 megabytes], (2 megabytes, 5 megabytes], and (5 megabytes, +∞ megabytes), where ∞ represents infinity. Table 1 may show data flow levels corresponding to (0 megabytes, 2 megabytes], (2 megabytes, 5 megabytes], and (5 megabytes, +∞ megabytes), where a "level 1" in the data flow levels is a lowest level, and a "level 3" in the data flow levels is a highest level. It can be learned from Table 1 that a larger target parameter in the target parameter range indicates a higher data flow level corresponding to the target parameter range, and a smaller target parameter in the target parameter range indicates a lower data flow level corresponding to the target parameter range.

TABLE 1

| Target parameter range | Data flow level |
|---|---|
| (0 megabytes, 2 megabytes] | Level 1 |
| (2 megabytes, 5 megabytes] | Level 2 |
| (5 megabytes, +∞ megabytes) | Level 3 |

When the switching device determines, in operation 403, that the length of the target queue is greater than the first length threshold and less than or equal to the second length threshold, the switching device needs to determine the level of the first data flow based on the target parameter that is of the first data flow and that is obtained through statistics collection in operation 402 and the one-to-one correspondence between the m+1 target parameter ranges and the plurality of data flow levels.

For example, assuming that the target parameter that is of the first data flow and that is obtained through statistics collection in operation 402 is 2 megabytes, it can be learned that the target parameter falls within the target parameter range (0 megabytes, 2 megabytes]. In this case, the switching device may determine, based on the correspondence, the data flow level "level 1" corresponding to the target parameter range (0 megabytes, 2 megabytes] as the level of the first data flow.

For another example, assuming that the target parameter that is of the first data flow and that is obtained through statistics collection in operation 402 is 3 megabytes, it can be learned that the target parameter falls within the target parameter range (2 megabytes, 5 megabytes]. In this case, the switching device may determine, based on the correspondence, the data flow level "level 2" corresponding to the target parameter range (2 megabytes, 5 megabytes] as the level of the first data flow.

In a third example implementation of operation 404, the switching device may also determine the level of the first data flow based on the target parameter of the first data flow and a correspondence between m+1 target parameter ranges and the plurality of data flow levels. In the correspondence between the m+1 target parameter ranges and the plurality of data flow levels, a plurality of target parameter ranges may correspond to a same data flow level.

Operation 405: The switching device determines whether the first data flow meets a marking condition. When the first data flow meets the marking condition, the switching device performs operation 406. When the first data flow does not meet the marking condition, the switching device performs operation 410.

In this embodiment of this application, the marking condition may be implemented in two manners. The following separately describes the two example implementations.

In a first example implementation of the marking condition, the marking condition may include: the level of the data flow is a non-lowest level in the plurality of data flow levels (e.g., the target parameter of the data flow is greater than the first target parameter threshold).

In this case, in operation 405, the switching device may determine, based on the level that is of the first data flow and that is determined in operation 404, whether the level of the first data flow is the non-lowest level. For example, for the three data flow levels shown in Table 1, the switching device may determine whether the level of the first data flow is the level "level 2" or "level 3" in the three data flow levels. When determining that the level of the first data flow is the non-lowest level, the switching device may determine that the first data flow meets the marking condition. When the level of the first data flow is not the non-lowest level (e.g., is a lowest level), the switching device may determine that the first data flow does not meet the marking condition.

When the switching device determines that the first data flow meets the marking condition, it indicates that the entire target queue is relatively long, and most data in the target queue is data in the first data flow. Therefore, a data flow that causes congestion on the switching device includes the first data flow. In this case, the switching device needs to perform operation 406 to operation 408 to perform ECN marking on the data packet in the first data flow, so as to reduce a transmission rate of the first data flow, eliminate congestion on the switching device, and improve transmission efficiency of another data flow. When the switching device determines that the first data flow does not meet the marking condition, it indicates that although the entire target queue is relatively long, most data in the target queue is not data in the first data flow. Therefore, a data flow that causes congestion on the switching device does not include the first data flow. In this case, the switching device may directly perform operation 410, and does not need to perform ECN marking on the data packet in the first data flow. In this way, when the length of the target queue is relatively long, ECN marking can be prevented from being performed on a data flow with a relatively small amount of data, and therefore transmission efficiency of the data flow (which may be referred to as a mice flow) with the relatively small amount of data is not reduced, and a delay is not caused to the data flow with the relatively small amount of data.

In a second example implementation of the marking condition, the marking condition may include: the level of the data flow is a non-lowest level in the plurality of data flow levels, and a transmission rate of the data flow is greater than fair bandwidth. When the target queue is a transmit queue, the transmission rate is a rate at which the switching device sends the data flow, and a target port is a transmit port that is in the switching device and that is used to send a data packet buffered into the target queue. When the target queue is a receive queue, the transmission rate is a rate at which the switching device receives the data flow, and a target port is a receive port that is in the switching device and that is used to receive a data packet buffered into the target queue.

The switching device may collect statistics about the transmission rate of the first data flow. It is assumed that the target port is the receive port, and the target queue is the transmit queue. Each time the switching device receives a data packet in the first data flow, a target parameter of the data packet is added to the target parameter that is of the first data flow and that is obtained by the switching device through statistics collection. When the transmission rate of the data flow includes the rate at which the switching device receives the first data flow, the switching device may determine a target parameter S1 added, in a time period T, to the target parameter that is of the first data flow and that is obtained through statistics collection, and use a ratio of S1 to T as the transmission rate of the first data flow. In some embodiments, the switching device continuously sends the data packet in the first data flow to a downstream device, and after the switching device sends the data packet in the first data flow, the target parameter of the data packet is deleted from the target parameter of the first data flow. When the transmission rate of the data flow includes the rate at which the switching device sends the first data flow, the switching device may determine a target parameter S2 deleted, in a time period T, from the target parameter that is of the first data flow and that is obtained through statistics collection, and use a ratio of S2 to T as the transmission rate of the first data flow.

In some embodiments, the fair bandwidth may be negatively correlated with a target quantity (for example, the fair bandwidth is equal to a ratio of bandwidth of the target port to the target quantity, or the fair bandwidth is equal to twice a ratio of bandwidth of the target port to the target quantity). The target quantity is a quantity of data flows whose levels belong to a level set in at least one data flow buffered into the target queue, and the level set includes p higher levels in a plurality of data flow levels, where $1 \leq p \leq m+1$. The plurality of data flow levels may be the same as or different from the plurality of data flow levels in operation 404. This is not limited in this embodiment of this application. For example, the fair bandwidth is equal to a ratio of bandwidth of the transmit port to the target quantity. Herein, p may be 1, or any value greater than 1 and less than or equal to m+1. For example, p is 2 or 3. The switching device needs to collect statistics about a target parameter of each data flow buffered into the target queue, needs to determine a level of each data flow based on the target parameter of each data flow, determines the target quantity based on the level of each data flow, and finally may determine the fair bandwidth based on the target quantity and the bandwidth of the target port.

For example, the switching device may use a ratio of the bandwidth of the transmit port to a quantity of data flows of a highest level as the fair bandwidth. For example, assuming that the bandwidth of the transmit port is 100 megabits per second, and the quantity of data flows of the highest level is 2, the switching device may determine the ratio, e.g., 50 megabits per second, of 100 megabits per second to 2 as the fair bandwidth. In some embodiments, the switching device may determine the fair bandwidth in another manner. For example, the switching device may use a ratio of a half of the bandwidth of the transmit port to the quantity of data flows of the highest level as the fair bandwidth. This is not limited in this embodiment of this application.

After determining the rate at which the switching device sends the first data flow and the fair bandwidth, the switching device may compare the rate at which the switching device sends the first data flow with the fair bandwidth, to determine whether the rate at which the switching device sends the first data flow is greater than the fair bandwidth. When the rate at which the switching device sends the first data flow is greater than the fair bandwidth, and the level of the first data flow is the non-lowest level, the switching device may determine that the first data flow meets the marking condition. In some embodiments, when the rate at which the switching device sends the first data flow is less than or equal to the fair bandwidth, and the level of the first data flow is the non-lowest level, the switching device may determine that the first data flow does not meet the marking condition. In some embodiments, when the rate at which the switching device sends the first data flow is less than or equal to the fair bandwidth, and the level of the first data flow is not the non-lowest level, the switching device may determine that the first data flow does not meet the marking condition. In some embodiments, when the rate at which the switching device sends the first data flow is greater than the fair bandwidth, and the level of the first data flow is not the non-lowest level, the switching device may determine that the first data flow does not meet the marking condition.

In the second example implementation, the switching device may determine, in the following operations, whether the first data flow meets the marking condition: The switching device first determines whether the level of the first data flow is the non-lowest level. When the level of the first data flow is not the non-lowest level (e.g., is the lowest level), the switching device may determine that the first data flow does not meet the marking condition. When the level of the first data flow is the non-lowest level, the switching device may determine whether the rate at which the switching device sends the first data flow is greater than the fair bandwidth. When the rate at which the switching device sends the first data flow is greater than the fair bandwidth, the switching device may determine that the first data flow meets the marking condition. When the rate at which the switching device sends the first data flow is less than or equal to the fair bandwidth, the switching device may determine that the first data flow does not meet the marking condition.

When the switching device determines that the first data flow meets the marking condition, it indicates that the entire target queue is relatively long, most data in the target queue is data in the first data flow, and the first data flow occupies a relatively large amount of bandwidth of the transmit port. Therefore, a data flow that causes congestion on the switching device includes the first data flow. In this case, the switching device needs to perform operation 406 to operation 408 to perform ECN marking on the data packet in the first data flow, so as to reduce a transmission rate of the first data flow, eliminate congestion on the switching device, and improve transmission efficiency of another data flow. When the switching device determines that the first data flow does not meet the marking condition, it indicates that although the entire target queue is relatively long, most data in the target queue is not data in the first data flow (and/or the first data flow occupies a relatively small amount of bandwidth of the transmit port). Therefore, a data flow that causes congestion on the switching device does not include the first data flow. In this case, the switching device does not need to perform ECN marking on the data packet in the first data flow, and may directly perform operation 410. In this way, when the length of the target queue is relatively long, ECN marking can be prevented from being performed on a data flow with a relatively small amount of data, and therefore transmission efficiency of the data flow with the relatively small amount of data is not reduced, and a delay is not caused to the data flow with the relatively small amount of data.

It should be noted that in this embodiment of this application, for example, a condition related to the data flow level in the marking condition includes: the level of the data flow is the non-lowest level in the plurality of data flow levels. A condition related to the data flow level in the marking condition may include: the level of the data flow does not belong to q lower levels in the plurality of data flow levels, where $q \geq 1$, for example, q=1, 2, or 3. This is not limited in this embodiment of this application.

Operation 406: The switching device determines, from n+1 length ranges, a target length range within which the length of the target queue falls.

It should be noted that the switching device may prestore n length thresholds, where a minimum length threshold in the n length thresholds is the first length threshold, a maximum length threshold in the n length thresholds is the second length threshold, and n≥1. The switching device may store the n+1 length ranges obtained through division based on the n length thresholds.

For example, the n length thresholds may include 100 kilobytes and 300 kilobytes. In this case, the first length threshold is 100 kilobytes, and the second length threshold is 300 kilobytes. The n+1 length ranges may include (0 kilobytes, 100 kilobytes], (100 kilobytes, 300 kilobytes], and (300 kilobytes, +∞ kilobytes]. For another example, the n length thresholds may include 100 kilobytes, 300 kilobytes, and 500 kilobytes. In this case, the first length threshold is 100 kilobytes, and the second length threshold is 500 kilobytes. The n+1 length ranges may include: (0 kilobytes, 100 kilobytes], (100 kilobytes, 300 kilobytes], (300 kilobytes, 500 kilobytes], and (500 kilobytes, +∞ kilobytes].

In operation 406, the switching device needs to search, based on the length of the target queue, the n+1 length ranges for the target length range within which the length of the target queue falls. For example, assuming that the n+1 length ranges include (0 kilobytes, 100 kilobytes], (100 kilobytes, 300 kilobytes], and (300 kilobytes, +∞ kilobytes], and the length of the target queue is 200 kilobytes, the switching device may determine that the target length range is (100 kilobytes, 300 kilobytes].

Operation 407: The switching device determines, based on the level of the first data flow and the target length range, a marking probability corresponding to the first data flow.

For example, after determining that the first data flow meets the marking condition, and determining the level of the first data flow and the target length range, the switching device may determine, based on the level of the first data flow and the target length range, the marking probability corresponding to the first data flow. The marking probability corresponding to the first data flow is a probability that ECN marking is performed on the data packet in the first data flow.

When the length of the target queue remains unchanged, a higher level of the first data flow indicates a higher marking probability corresponding to the first data flow. When the level of the first data flow remains unchanged, a longer length in the target length range (e.g., a length range within which the length of the target queue falls) indicates a higher marking probability corresponding to the first data flow. A higher level of the first data flow indicates a larger amount of data in the first data flow. In this case, a degree of association between the first data flow and transmission congestion is higher, and ECN marking needs to be performed on more data packets in the first data flow, to greatly reduce a transmission rate of the first data flow, further reduce the length of the target queue, and relieve congestion on the switching device. A longer length in the target length range indicates a longer length of the target queue. In this case, ECN marking needs to be performed on more data packets in the first data flow, to greatly reduce a transmission rate of the first data flow, further reduce the length of the target queue, and relieve congestion on the switching device.

Figure 6:
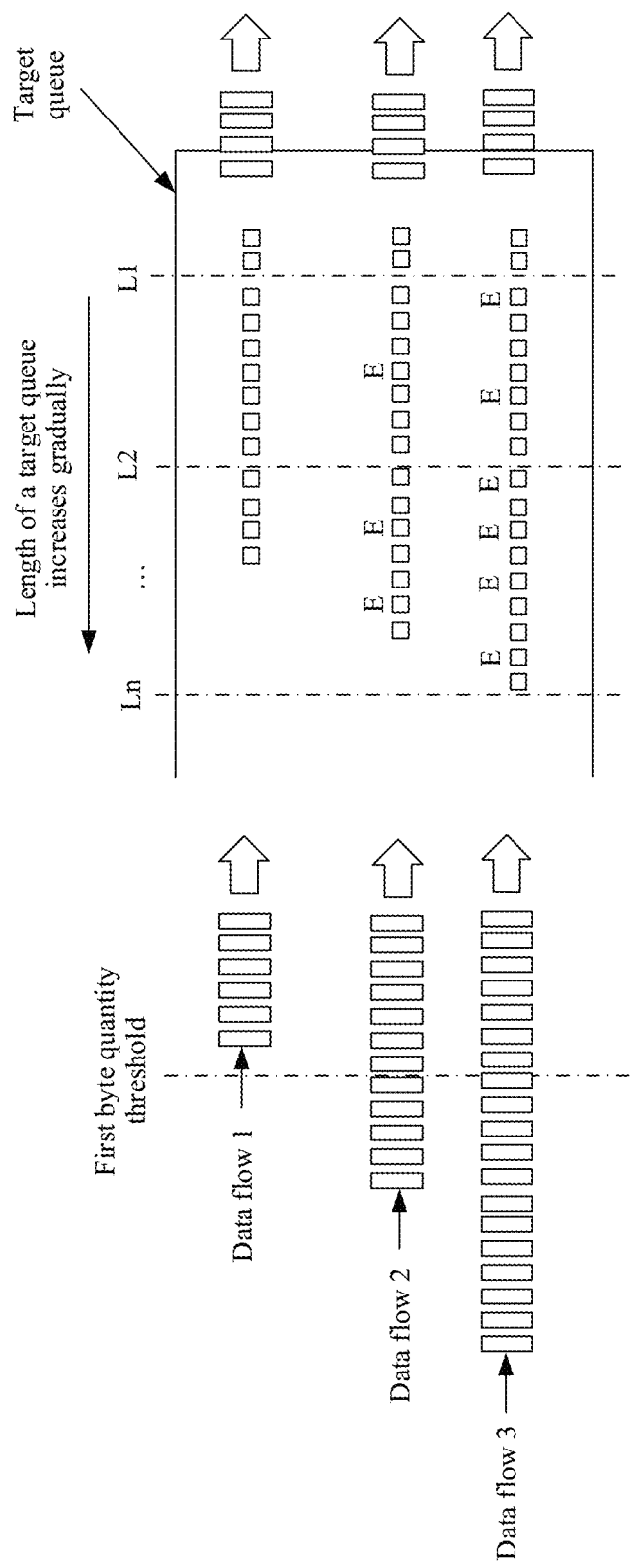
FIG. 6 is a schematic diagram of transmission of a data flow according to an embodiment of this application.

For example, refer to FIG. 6. It is assumed that the at least one data flow includes a data flow 1, a data flow 2, and a data flow 3, a target parameter of the data flow 1, a target parameter of the data flow 2, and a target parameter of the data flow 3 increase sequentially, the target parameter of the data flow 1 is less than the first target parameter threshold, and the target parameters of the data flow 2 and the data flow 3 each are greater than the first target parameter threshold.

When the length of the target queue is between L1 (Lj indicates a $j^{th}$ length threshold arranged in ascending order of the n length thresholds, and 1≤j≤n) and L2, marking probabilities corresponding to three data flows are all 0. In this case, ECN marking is not performed on data packets in the three data flows.

When the length of the target queue is between L1 and L2, a level of the data flow 1 is the "level 1". Therefore, a marking probability corresponding to the data flow 1 is 0, and ECN marking is not performed on a data packet in the data flow 1. Levels of the data flows 2 and 3 each are greater than the "level 1". Therefore, marking probabilities corresponding to the data flows 2 and 3 each are greater than 0. In some embodiments, because the target parameter of the data flow 2 is less than the target parameter of the data flow 3, the marking probability corresponding to the data flow 2 is less than the marking probability corresponding to the data flow 3. As shown in FIG. 6, ECN marking is performed on one data packet in the data flow 2, and the data packet is marked with a mark E; and ECN marking is performed on two data packets in the data flow 3, and the two data packets are marked with two marks E.

When the length of the target queue is between L2 and Ln, a level of the data flow 1 is the "level 1". Therefore, a marking probability corresponding to the data flow 1 is 0, and ECN marking is not performed on a data packet in the data flow 1. Levels of the data flows 2 and 3 each are greater than the "level 1". Therefore, marking probabilities corresponding to the data flows 2 and 3 each are greater than 0. In some embodiments, because the target parameter of the data flow 2 is less than the target parameter of the data flow 3, the marking probability corresponding to the data flow 2 is less than the marking probability corresponding to the data flow 3. In some embodiments, in this case, the length of the target queue is relatively long. Therefore, as shown in FIG. 6, ECN marking is performed on two data packets in the data flow 2, and the two data packets are marked with two marks E; and ECN marking is performed on four data packets in the data flow 3, and the four data packets are marked with four marks E.

The switching device may determine, in a plurality of manners based on the level of the first data flow and the target length range, the marking probability corresponding to the first data flow. For example, the switching device may determine, based on the level of the first data flow and the target length range by using a first formula, the marking probability corresponding to the first data flow.

The first formula includes: $P(j,i)=P(j-1,i)+Q(i,j)*(L-L_j)/(L_{j+1}-L_j)$.

Herein, $L_j$ represents a $j^{th}$ length threshold arranged in ascending order of the n length thresholds, where 1≤j≤n; $L_{j+1}$ represents a $(j+1)^{th}$ length threshold arranged in ascending order of the n length thresholds; L represents the length of the target queue; $P(j,i)$ represents a marking probability corresponding to an $i^{th}$ level of data flow in the at least one data flow when L falls within $(L_j, L_{j+1}]$, where 1≤i≤m+1; when j−1>0, $P(j-1,i)$ represents a marking probability corresponding to the $i^{th}$ level of data flow in the at least one data flow when L falls within $(L_{j-1}, L_j]$; when j−1=0, $P(j-1,i)=0$; $Q(i, j)$ represents a marking coefficient of the $i^{th}$ level of data flow when L falls within $(L_j, L_{j+1}]$; and $Q(1,j)=0$, and $$\sum_{j=1}^{n} Q(i, j) \leq 1.$$

Operation 408: The switching device performs, based on the marking probability corresponding to the first data flow, ECN marking on the data packet in the first data flow.

After determining the marking probability corresponding to the first data flow, the switching device may perform ECN marking on the data packet in the first data flow based on the marking probability. For example, a higher marking probability corresponding to the first data flow indicates more data packets on which ECN marking is performed in the first data flow; and a lower marking probability corresponding to the first data flow indicates fewer data packets on which ECN marking is performed in the first data flow. When the marking probability corresponding to the first data flow is 0, the switching device may not perform ECN marking on the data packet in the first data flow. When the marking probability corresponding to the first data flow is greater than 0, the switching device may perform ECN marking on the data packet in the first data flow based on the marking probability corresponding to the first data flow.

Operation 409: The switching device performs ECN marking on each data packet in the first data flow.

When the length of the target queue is greater than the second length threshold, it indicates that the length of the target queue is about to reach an upper length limit. In this case, the switching device needs to perform ECN marking on each data packet in each data flow, to quickly reduce a transmission rate of the first data flow, further quickly reduce the length of the target queue, and avoid a data packet loss.

It should be noted that in this embodiment of this application, for example, the switching device performs ECN marking on each data packet in the first data flow in operation 409 (e.g., the marking probability corresponding to the first data flow is 100%). In some embodiments, in operation 409, the switching device may determine that the marking probability corresponding to the first data flow is not 100%, but is a relatively high probability, for example, a probability in 90% to 99% or a probability in 85% to 99%, and performs ECN marking on the data packet in the first data flow based on the marking probability corresponding to the first data flow. This is not limited in this embodiment of this application.

Operation 410: The switching device does not perform ECN marking on the data packet in the first data flow.

When determining that the length of the target queue is less than the first length threshold, the switching device may determine that the length of the target queue meets neither the first length condition nor the second length condition. In this case, it indicates that the length of the target queue is relatively short, and no congestion occurs in the target queue. Therefore, the switching device does not need to perform ECN marking on the data packet in the first data flow.

When the switching device determines that the target queue meets the first length condition and the first data flow does not meet the marking condition, it indicates that the length of the target queue is relatively long, but a relatively large amount of data in the target queue is not data in the first data flow. Therefore, the first data flow is not a data flow that causes congestion in the target queue, and the switching device does not need to perform ECN marking on the data packet in the first data flow.

It should be noted that in this embodiment of this application, for example, the switching device does not perform ECN marking on each data packet in the first data flow in operation 410 (e.g., the marking probability corresponding to the first data flow is 0). In some embodiments, in operation 410, the switching device may determine that the marking probability corresponding to the first data flow is not 0, but is a relatively low probability, for example, a probability in 1% to 10% or a probability in 2% to 20%, and performs ECN marking on the data packet in the first data flow based on the marking probability corresponding to the first data flow. This is not limited in this embodiment of this application.

In conclusion, in the data packet marking method provided in this embodiment of this application, when the switching device determines that the first data flow meets the marking condition, it indicates that the target queue is relatively long, and most data in the target queue is data in the first data flow. Therefore, a data flow that causes congestion on the switching device includes the first data flow. In this case, the switching device needs to perform ECN marking on the data packet in the first data flow, to reduce a transmission rate of the first data flow, eliminate congestion on the switching device, and improve transmission efficiency of another data flow. In some embodiments, when the switching device determines that the first data flow does not meet the marking condition, it indicates that although the entire target queue is relatively long, most data in the target queue is not data in the first data flow. Therefore, a data flow that causes congestion on the switching device does not include the first data flow. In this case, the switching device does not need to perform ECN marking on the data packet in the first data flow. In this way, when the length of the target queue is relatively long, ECN marking can be prevented from being performed on a data flow with a relatively small amount of data, and therefore transmission efficiency of the data flow with the relatively small amount of data is not reduced, and a delay is not caused to the data flow with the relatively small amount of data.

The following uses several examples to describe the data packet marking method provided in this embodiment of this application.

In a first example, the marking condition includes: the level of the data flow is the non-lowest level.

Figure 7:
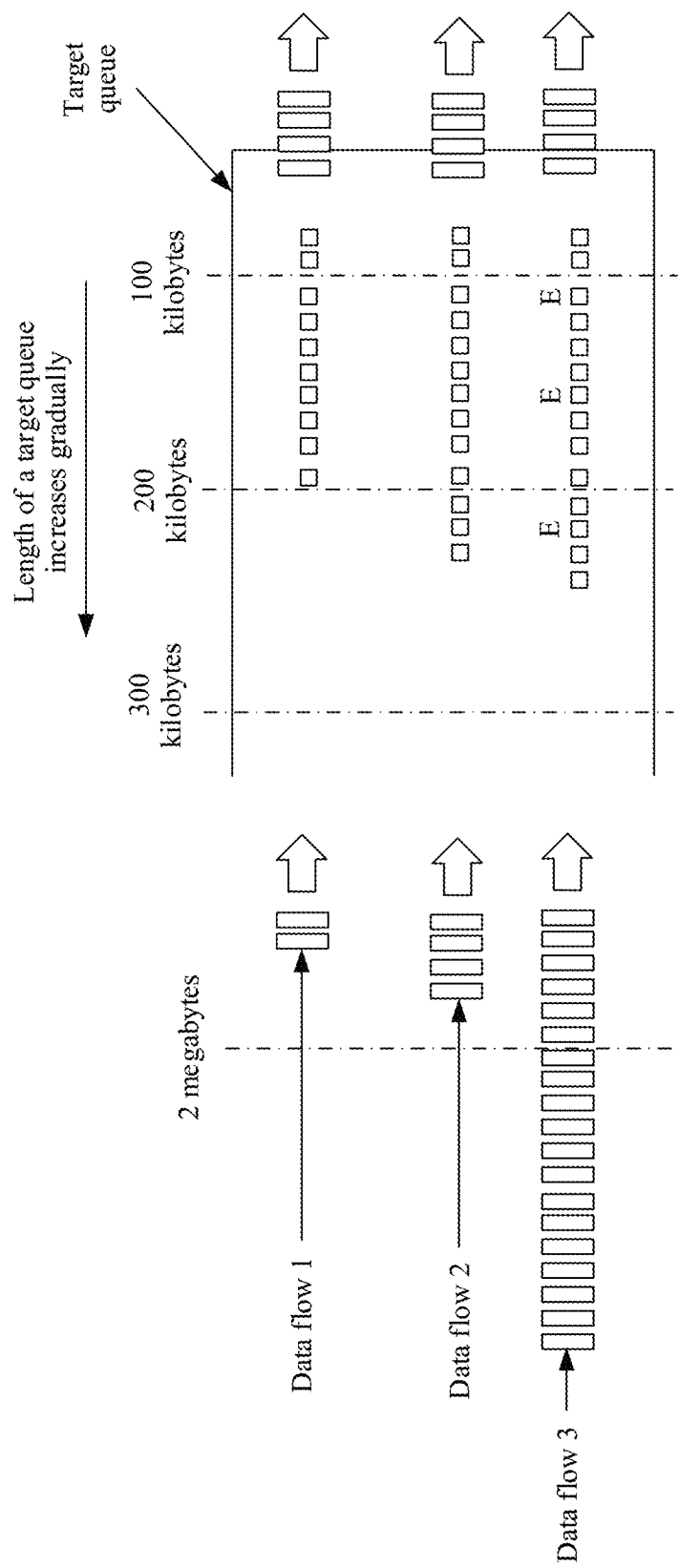
FIG. 7 is a schematic diagram of other transmission of a data flow according to an embodiment of this application.

FIG. 7 is a schematic diagram of other transmission of a data flow according to an embodiment of this application. As shown in FIG. 7, it is assumed that at least one data flow buffered into a target queue includes a data flow 1, a data flow 2, and a data flow 3, m length thresholds include 100 kilobytes (a first length threshold) and 300 kilobytes (a second length threshold), and n target parameter thresholds include 2 megabytes (a first target parameter threshold). It is assumed that the length that is of the target queue and that is determined by the switching device is 200 kilobytes, and in this case, a target parameter that is of the data flow 1 and that is obtained by the switching device through statistics collection is 500 kilobytes, a target parameter that is of the data flow 2 and that is obtained by the switching device through statistics collection is 1.5 megabytes, and a target parameter that is of the data flow 3 and that is obtained by the switching device through statistics collection is 6 megabytes.

The switching device may determine that the length of the target queue is greater than the first length threshold (100 kilobytes) and less than or equal to the second length threshold (300 kilobytes). In some embodiments, the switching device may compare each of the target parameters of the data flow 1, the data flow 2, and the data flow 3 with the first target parameter threshold. After the comparison, the switching device may determine that the target parameter (500 kilobytes) of the data flow 1 is less than the first target parameter threshold (2 megabytes), and therefore a level of the data flow 1 is a "level 1"; determine that the target parameter (1.5 megabytes) of the data flow 2 is less than the first target parameter threshold (2 megabytes), and therefore a level of the data flow 2 is the "level 1"; and determine that the target parameter (6 megabytes) of the data flow 3 is greater than the first target parameter threshold (2 megabytes), and therefore a level of the data flow 3 is a "level 2".

Two target parameter ranges are obtained through division based on the target parameter threshold 2 megabytes, and a lowest level in two data flow levels corresponding to the two target parameter ranges is the "level 1". Therefore, the switching device may determine that both the level of the data flow 1 and the level of the data flow 2 are the lowest levels, and the level of the data flow 3 is the non-lowest level. Further, the switching device may determine that the data flow 1 and the data flow 2 do not meet the marking condition, and therefore does not perform ECN marking on data packets in the data flow 1 and the data flow 2. The switching device may determine that the data flow 3 meets the marking condition.

It is assumed that $Q(2, 1)=0.5$. The switching device may determine a marking probability $P(1, 2)=P(0, 2)+Q(2, 1)\times(L-L1)/(L2-L1)=0+0.5\times(200-100)/(300-100)=0.25$ according to a first formula, and perform ECN marking on a data packet in the data flow 3 based on the marking probability 0.25.

If ECN marking is performed on the data packet by using a marking method in a related technology, ECN marking may be performed on both the data flow 1 and the data flow 2 that have a relatively small amount of data. However, in this embodiment of this application, the data flow 1 and the data flow 2 that have the relatively small amount of data are protected, and ECN marking is not performed on the data flow 1 and the data flow 2, to reduce delays of the data flow 1 and the data flow 2.

In a second example, the marking condition includes: the level of the data flow is the non-lowest level.

Figure 8:
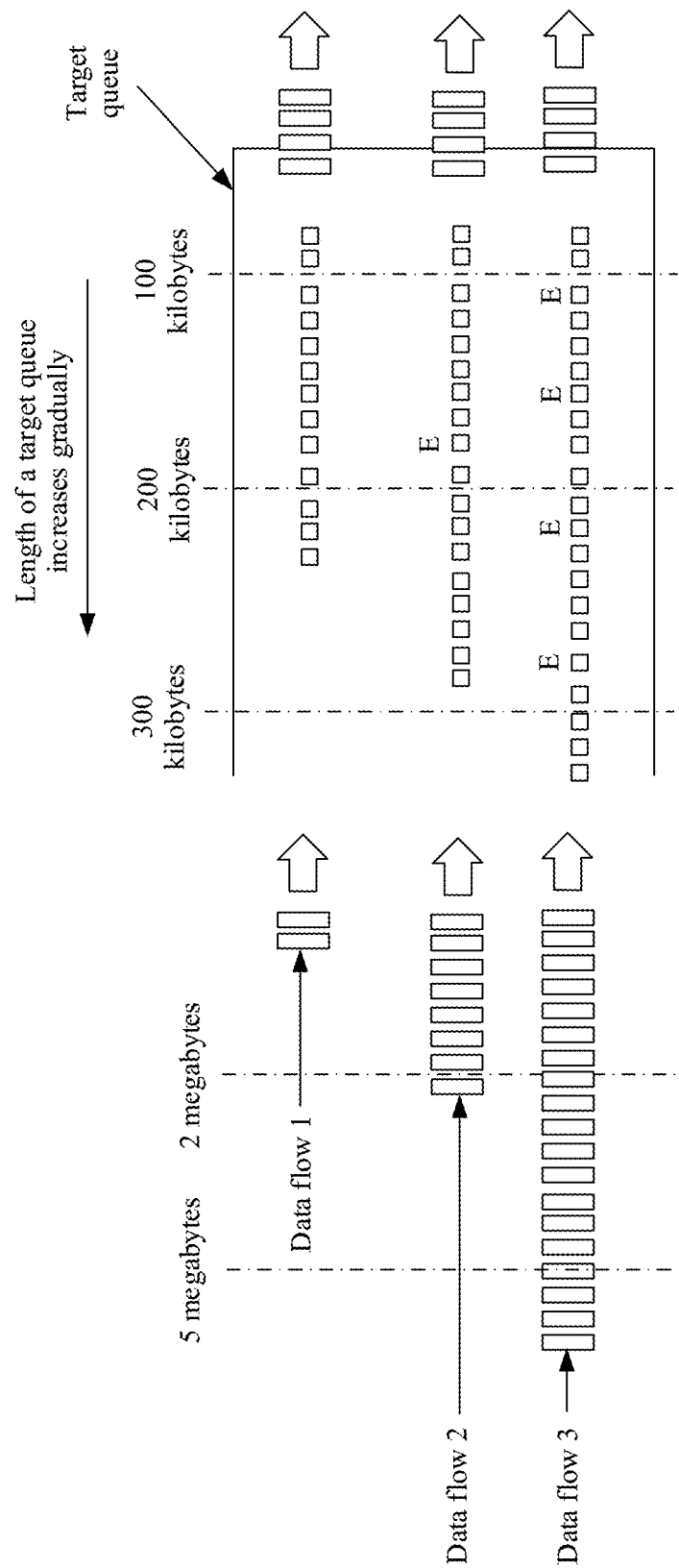
FIG. 8 is a schematic diagram of other transmission of a data flow according to an embodiment of this application.

FIG. 8 is a schematic diagram of other transmission of a data flow according to an embodiment of this application. As shown in FIG. 8, it is assumed that the at least one data flow includes a data flow 1, a data flow 2, and a data flow 3, m length thresholds include 100 kilobytes (a first length threshold) and 300 kilobytes (a second length threshold), and n target parameter thresholds include 2 megabytes (a first target parameter threshold) and 5 megabytes. It is assumed that the length that is of the target queue and that is determined by the switching device is 200 kilobytes, and in this case, a target parameter that is of the data flow 1 and that is obtained by the switching device through statistics collection is 500 kilobytes, a target parameter that is of the data flow 2 and that is obtained by the switching device through statistics collection is 2.5 megabytes, and a target parameter that is of the data flow 3 and that is obtained by the switching device through statistics collection is 6 megabytes.

The switching device may determine that the length of the target queue is greater than the first length threshold (100 kilobytes) and less than or equal to the second length threshold (300 kilobytes). In some embodiments, the switching device may compare each of the target parameters of the data flow 1, the data flow 2, and the data flow 3 with the first target parameter threshold. After the comparison, the switching device may determine that the target parameter (500 kilobytes) of the data flow 1 is less than the first target parameter threshold (2 megabytes), and therefore a level of the data flow 1 is a "level 1"; determine that the target parameter (2.5 megabytes) of the data flow 2 is greater than the first target parameter threshold (2 megabytes), and therefore a level of the data flow 2 is the "level 2"; and determine that the target parameter (6 megabytes) of the data flow 3 is greater than the first target parameter threshold (2 megabytes), and therefore a level of the data flow 3 is a "level 2".

Three target parameter ranges are obtained through division based on the target parameter thresholds 2 megabytes and 5 megabytes, and a lowest level in three data flow levels corresponding to the three target parameter ranges is the "level 1". Therefore, the switching device may determine that the level of the data flow 1 is the lowest level, and the levels of the data flow 2 and the data flow 3 are the non-lowest levels. Further, the switching device may determine that the data flow 1 does not meet the marking condition, and therefore does not perform ECN marking on a data packet in the data flow 1. The switching device may determine that the data flow 2 and the data flow 3 meet the marking condition.

It is assumed that $Q(2, 1)=0.2$. The switching device may determine a marking probability $P(1, 2)=P(0, 2)+Q(2, 1)\times(L-L1)/(L2-L1)=0+0.2\times(200-100)/(300-100)=0.1$ according to a first formula, and perform ECN marking on a data packet in the data flow 2 based on the marking probability 0.1. For another example, it is assumed that $Q(3, 1)=0.8$. The switching device may determine a marking probability $P(1, 3)=P(0, 3)+Q(3, 1)\times(L-L1)/(L2-L1)=0+0.8\times(200-100)/(300-100)=0.4$ according to a first formula, and perform ECN marking on a data packet in the data flow 3 based on the marking probability 0.4.

If ECN marking is performed on the data packet by using a marking method in a related technology, ECN marking may be performed on the data flow 1 with a relatively small amount of data. However, in this embodiment of this application, the data flow 1 with the relatively small amount of data is protected, and ECN marking is not performed on the data flow 1, to reduce a delay of the data flow 1.

In a third example, the marking condition includes: the level of the data flow is the non-lowest level.

Figure 9:
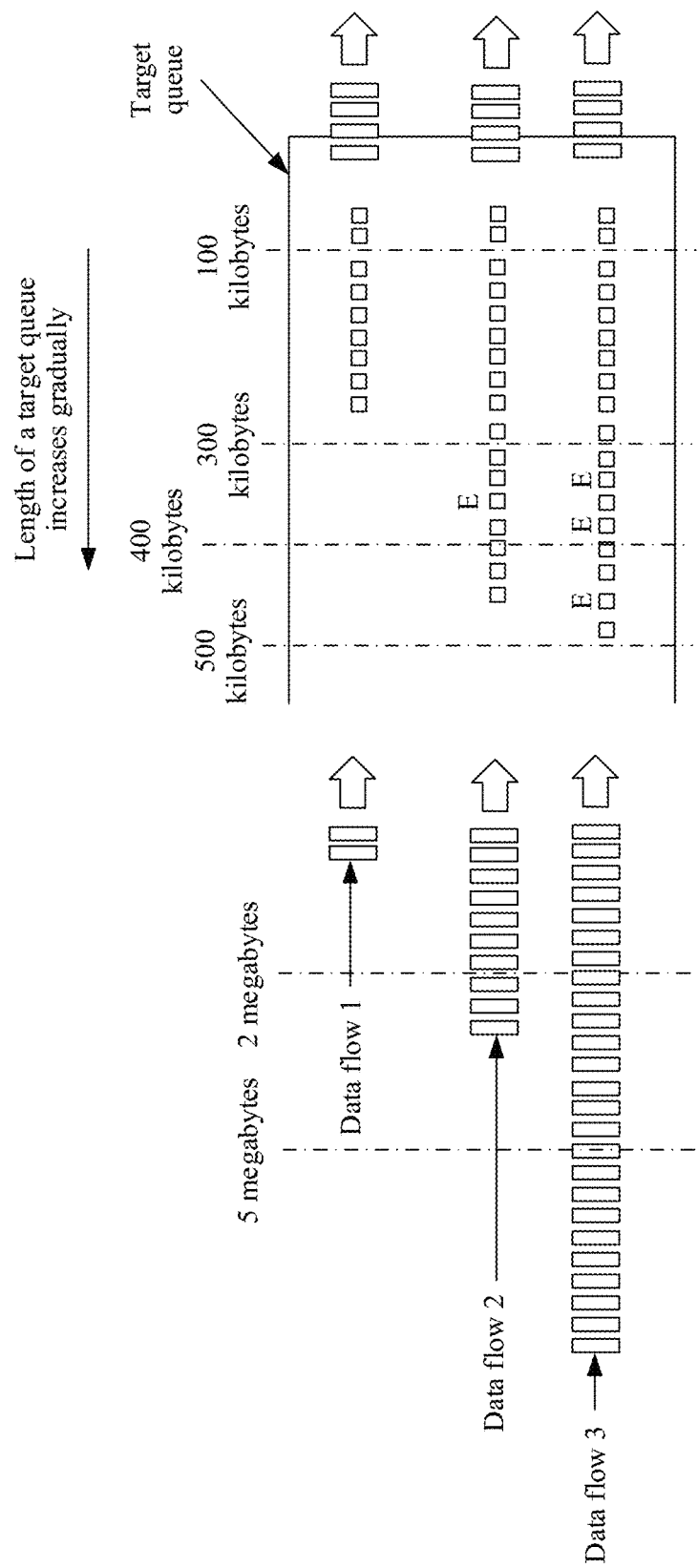
FIG. 9 is a schematic diagram of other transmission of a data flow according to an embodiment of this application.

FIG. 9 is a schematic diagram of other transmission of a data flow according to an embodiment of this application. As shown in FIG. 9, it is assumed that the at least one data flow includes a data flow 1, a data flow 2, and a data flow 3, m length thresholds include 100 kilobytes (a first length threshold), 300 kilobytes, and 500 kilobytes (a second length threshold), and n target parameter thresholds include 1 megabyte (a first target parameter threshold) and 5 megabytes. It is assumed that the length that is of the target queue and that is determined by the switching device is 400 kilobytes, and in this case, a target parameter that is of the data flow 1 and that is obtained by the switching device through statistics collection is 500 kilobytes, a target parameter that is of the data flow 2 and that is obtained by the switching device through statistics collection is 3 megabytes, and a target parameter that is of the data flow 3 and that is obtained by the switching device through statistics collection is 8 megabytes.

The switching device may determine that the length of the target queue is greater than 300 kilobytes and less than or equal to 500 kilobytes (the length of the target queue is greater than the first length threshold and less than or equal to the second length threshold). In some embodiments, the switching device may compare each of the target parameters of the data flow 1, the data flow 2, and the data flow 3 with the first target parameter threshold. After the comparison, the switching device may determine that the target parameter (500 kilobytes) of the data flow 1 is less than the first target parameter threshold (1 megabyte), and therefore a level of the data flow 1 is a "level 1"; determine that the target parameter (3 megabytes) of the data flow 2 is greater than the first target parameter threshold (1 megabyte) but less than 5 megabytes, and therefore a level of the data flow 2 is a "level 2"; and determine that the target parameter (8 megabytes) of the data flow 3 is greater than 5 megabytes (the target parameter of the data flow 3 is greater than the first target parameter threshold), and therefore a level of the data flow 3 is a "level 3".

Three target parameter ranges are obtained through division based on the target parameter thresholds 1 megabyte and 5 megabytes, and a lowest level in three data flow levels corresponding to the three target parameter ranges is the "level 1". Therefore, the switching device may determine that the level of the data flow 1 is the lowest level, and the levels of the data flow 2 and the data flow 3 are the non-lowest levels. Further, the switching device may determine that the data flow 1 does not meet the marking condition, and therefore does not perform ECN marking on a data packet in the data flow 1. The switching device may determine that the data flow 2 and the data flow 3 meet the marking condition.

It is assumed that Q(2, 1)=0.2 and Q(2, 2)=0.4. The switching device may determine a marking probability P(2, 2)=P(1, 2)+Q(2, 2)×(L−L2)/(L3−L2)=0.4 according to a first formula, where P(1, 2)=P(0, 2)+Q(2, 1)×(L−L1)/(L2−L1) =0.2, and perform ECN marking on a data packet in the data flow 2 based on the marking probability 0.4.

It is assumed that Q(3, 1)=0.4 and Q(3, 2)=0.6. The switching device may determine a marking probability P (2, 3)=P(1, 3)+Q(3, 2)×(L−L2)/(L3−L2)=0.7 according to a first formula, where P (1, 3)=P(0, 3)+Q(3, 1)×(L−L1)/(L2−L1) =0.4, and perform ECN marking on a data packet in the data flow 3 based on the marking probability 0.7.

If ECN marking is performed on the data packet by using a marking method in a related technology, ECN marking may be performed on the data flow 1 with a relatively small amount of data. However, in this embodiment of this application, the data flow 1 with the relatively small amount of data is protected, and ECN marking is not performed on the data flow 1, to reduce a delay of the data flow 1.

In a fourth example, the marking condition includes: the level of the data flow is the non-lowest level, and the rate at which the switching device sends the data flow is greater than the fair bandwidth.

Figure 10:
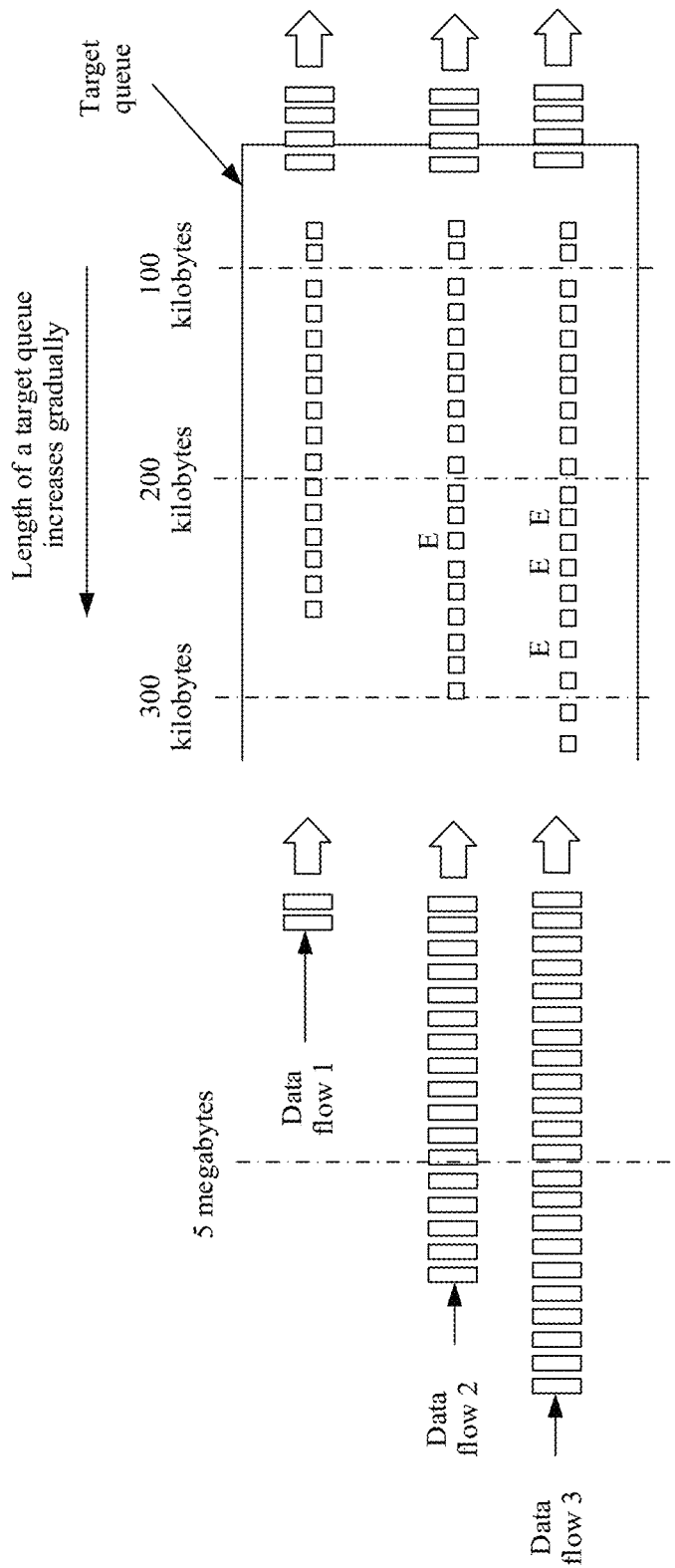
FIG. 10 is a schematic diagram of other transmission of a data flow according to an embodiment of this application.

FIG. 10 is a schematic diagram of other transmission of a data flow according to an embodiment of this application. As shown in FIG. 10, it is assumed that the at least one data flow includes a data flow 1, a data flow 2, and a data flow 3, m length thresholds include 100 kilobytes (a first length threshold) and 300 kilobytes (a second length threshold), and n target parameter thresholds include 5 megabytes (a first target parameter threshold). It is assumed that the length that is of the target queue and that is determined by the switching device is 200 kilobytes, and in this case, a target parameter that is of the data flow 1 and that is obtained by the switching device through statistics collection is 500 kilobytes, and a rate at which the switching device sends the data flow is 0.01 times bandwidth of a transmit port (in this case, an example in which a target port is the transmit port); a target parameter that is of the data flow 2 and that is obtained by the switching device through statistics collection is 8 megabytes, and a rate at which the switching device sends the data flow is 0.2 times the bandwidth of the transmit port; and a target parameter that is of the data flow 3 and that is obtained by the switching device through statistics collection is 10 megabytes, and a rate at which the switching device sends the data flow is 0.8 times the bandwidth of the transmit port.

The switching device may determine that the length of the target queue is greater than 100 kilobytes and less than or equal to 300 kilobytes (the length of the target queue is greater than the first length threshold and less than or equal to the second length threshold). In some embodiments, the switching device may compare each of the target parameters of the data flow 1, the data flow 2, and the data flow 3 with the first target parameter threshold. After the comparison, the switching device may determine that the target parameter (500 kilobytes) of the data flow 1 is less than the first target parameter threshold (5 megabytes), and therefore a level of the data flow 1 is a "level 1"; determine that the target parameter (8 megabytes) of the data flow 2 is greater than the first target parameter threshold (5 megabytes), and therefore a level of the data flow 2 is a "level 2"; and determine that the target parameter (10 megabytes) of the data flow 3 is greater than the first target parameter threshold (5 megabytes), and therefore a level of the data flow 3 is the "level 2".

Two target parameter ranges are obtained through division based on the target parameter threshold 5 megabytes, and a lowest level in two data flow levels corresponding to the two target parameter ranges is the "level 1". Therefore, the switching device may determine that the level of the data flow 1 is the lowest level, and the levels of the data flow 2 and the data flow 3 are the non-lowest levels. Further, the switching device may determine that the data flow 1 does not meet the marking condition, and therefore does not perform ECN marking on a data packet in the data flow 1.

It is assumed that the fair bandwidth is: Bandwidth of the transmit port/Quantity (e.g., 2) of flows of a second level=0.5 times the bandwidth of the transmit port. The switching device may compare each of the rate at which the switching device sends the data flow 2 and the rate at which the switching device sends the data flow 3 with the fair bandwidth, to obtain the following conclusions: The rate at which the switching device sends the data flow 2 (0.2 times the bandwidth of the transmit port) is less than the fair bandwidth (0.5 times the bandwidth of the transmit port), and the rate at which the switching device sends the data flow 3 (0.8 times the bandwidth of the transmit port) is greater than the fair bandwidth (0.5 times the bandwidth of the transmit port). Further, the switching device may determine that the data flow 2 does not meet the marking condition either, but the data flow 3 meets the marking condition, and therefore does not need to perform ECN marking on the data flow 2, but needs to perform ECN marking on the data flow 3.

In some embodiments, it is assumed that Q(2, 1)=0.5. The switching device may determine, according to a first formula, a marking probability P(1, 2)=Q(2, 1)×(L−L1)/(L2−L1)=0.25 corresponding to the data flow 3, and perform ECN marking on a data packet in the data flow 3 based on the marking probability 0.25.

If ECN marking is performed on the data packet by using a marking method in a related technology, ECN marking may be performed on both the data flow 1 with a relatively small amount of data and the data flow 2 with a relatively low transmission rate. However, in this embodiment of this application, the data flow 1 with the relatively small amount of data and the data flow 2 with the relatively low transmission rate are protected, and ECN marking is not performed on the data flow 1 and the data flow 2, to reduce delays of the data flow 1 and the data flow 2.

In FIG. 5, the switching device determines the level of the first data flow based on the target parameter of the first data flow, and determines, based on the level of the first data flow and the target length range, the marking probability corresponding to the first data flow. In some embodiments, the marking probability corresponding to the first data flow may be determined in another manner. The following uses other implementations of determining the marking probability corresponding to the first data flow as an example for description.

In a first example implementation, the switching device may directly determine, based on the target parameter of the first data flow, the marking probability corresponding to the first data flow. To be specific, when the marking probability corresponding to the first data flow is determined, a relatively proper marking probability may be determined based on only the target parameter.

When a marking probability determined based on a second target parameter is greater than a marking probability determined based on a first target parameter, it indicates that the second target parameter is greater than the first target parameter. For example, assuming that the first target parameter is 500 kilobytes, and the second target parameter is 1000 kilobytes, the marking probability determined based on the first target parameter may be 20%, and the marking probability determined based on the second target parameter may be 40%.

It should be noted that when one target parameter is greater than another target parameter, a marking probability determined based on the one target parameter is not necessarily greater than a marking probability determined based on the another target parameter. For example, a marking probability determined based on a target parameter of 500 kilobytes may be 20%, and a marking probability determined based on a target parameter of 600 kilobytes may be 20%. Certainly, when one target parameter is greater than another target parameter, a marking probability determined based on the one target parameter may be definitely greater than a marking probability determined based on the another target parameter. To be specific, the target parameter of the data flow may be positively correlated with the marking probability corresponding to the data flow. This is not limited in this embodiment of this application.

In a second example implementation, the switching device may first determine the level of the first data flow based on the target parameter of the first data flow, and determine, based on the target parameter and the level of the first data flow (or based on only the level of the first data flow), the marking probability corresponding to the first data flow. To be specific, when the marking probability corresponding to the first data flow is determined, a relatively proper marking probability may be determined based on both the target parameter of the first data flow and the level of the first data flow. In some embodiments, when the marking probability corresponding to the first data flow is determined, a relatively proper marking probability may be determined based on only the level of the first data flow.

For a process in which the switching device determines the level of the first data flow based on the target parameter of the first data flow, refer to a related process in the embodiment shown in FIG. 5. It should be noted that the level of the first data flow may be related to the target parameter of the first data flow. When a second flow level (one data flow level) related to a second target parameter is greater than a first flow level (another data flow level) related to a first target parameter, the second target parameter is greater than the first target parameter. To be specific, a higher data flow level indicates a larger target parameter related to the data flow level. However, when one target parameter is greater than another target parameter, a data flow level related to the one target parameter is not necessarily greater than a data flow level related to the another target parameter.

For example, the target parameter of the first data flow falls within one of a plurality of target parameter ranges, the plurality of target parameter ranges are in a one-to-one correspondence with a plurality of data flow levels, and the level of the first data flow is a data flow level that is in the plurality of data flow levels and that corresponds to the one target parameter range (e.g., a target parameter range within which the target parameter of the first data flow falls). When determining the level of the first data flow based on the target parameter of the first data flow, the switching device may first search the plurality of target parameter ranges for one target parameter range within which the target parameter of the first data flow falls. In some embodiments, the switching device may search the one-to-one correspondence between the plurality of target parameter ranges and the plurality of data flow levels for a data flow level corresponding to the one target parameter range, and determine the data flow level as the level of the first data flow. For a process of determining the level of the first data flow, refer to the descriptions in the embodiment shown in FIG. 5. Details are not described herein in this embodiment of this application.

In some embodiments, when one target parameter is greater than another target parameter, a data flow level related to the one target parameter may be definitely greater than a data flow level related to the another target parameter. To be specific, the target parameter of the data flow may be positively correlated with the level of the data flow. This is not limited in this embodiment of this application.

Descriptions are provided below in two aspects in the second example implementation.

In some embodiments, when the switching device determines, based on the level of the first data flow, the marking probability corresponding to the first data flow, if a marking probability determined based on a second flow level (one data flow level) is greater than a marking probability determined based on a first flow level (another data flow level), it may indicate that the second flow level is greater than the first flow level. To be specific, a higher marking probability corresponding to the first data flow indicates a higher level that is of the first data flow and that is related to the marking probability. It should be noted that when one data flow level is greater than another data flow level, a marking probability determined based on the one data flow level is not necessarily greater than a marking probability determined based on the another data flow level. Certainly, when one data flow level is greater than another data flow level, a marking probability determined based on the one data flow level may be definitely greater than a marking probability determined based on the another data flow level. To be specific, the level of the data flow may be positively correlated with the marking probability corresponding to the data flow. This is not limited in this embodiment of this application.

In some embodiments, when the switching device determines, based on the target parameter and the level of the first data flow, the marking probability corresponding to the first data flow, if the level of the first data flow remains unchanged, the determined marking probability corresponding to the first data flow may increase as the target parameter of the first data flow increases. To be specific, when the level of the first data flow remains unchanged, the marking probability corresponding to the first data flow may be positively correlated with the target parameter of the first data flow. In some embodiments, the marking probability corresponding to the first data flow may be positively correlated with the level of the first data flow.

In this embodiment of this application, for example, the switching device determines, based on at least one of the target parameter and the level of the first data flow, the marking probability corresponding to the first data flow. In some embodiments, the switching device may determine, based on at least one of the target parameter and another parameter of the first data flow, the marking probability corresponding to the first data flow. The another parameter is related to the target parameter of the first data flow. For example, the another parameter may be a difference between the target parameter of the first data flow and a target parameter threshold. Generally, the switching device may determine, based on at least one of the target parameter and an auxiliary parameter of the first data flow, the marking probability corresponding to the first data flow, where the auxiliary parameter is related to the target parameter of the first data flow (for example, the auxiliary parameter is the level of the first data flow).

In a third example implementation, when determining, based on at least one of the target parameter and an auxiliary parameter of the first data flow, the marking probability corresponding to the first data flow, the switching device may determine, based on a parameter different from both the target parameter and the auxiliary parameter, the marking probability corresponding to the first data flow. For example, the switching device may determine, based on at least one of the target parameter and the auxiliary parameter (for example, the level) of the first data flow and at least one of the length and a level of the target queue, the marking probability corresponding to the first data flow.

The level of the target queue is related to the length of the target queue. For example, when a second queue level related to a second queue length is greater than a first queue level related to a first queue length, the second queue length is greater than the first queue length. To be specific, a higher queue level indicates a longer queue length related to the queue level. For example, the length of the target queue may fall within one of a plurality of length ranges, the plurality of length ranges are in a one-to-one correspondence with a plurality of queue levels, and the level of the target queue is a queue level that is in the plurality of queue levels and that corresponds to the one length range (e.g., a length range within which the length of the target queue falls). To be specific, a higher queue level indicates a longer queue length related to the queue level. When determining the level of the target queue, the switching device may first search the plurality of length ranges for one length range within which the length of the target queue falls. In some embodiments, the switching device may search the one-to-one correspondence between the plurality of length ranges and the plurality of queue levels for a queue level corresponding to the one length range, and use the queue level as the level of the target queue.

However, when one queue length is greater than another queue length, a queue level related to the one queue length is not necessarily greater than a queue level related to the another queue length. Certainly, when one queue length is greater than another queue length, a queue level related to the one queue length may be definitely greater than a queue level related to the another queue length. To be specific, the level of the queue is positively correlated with the length of the queue. This is not limited in this embodiment of this application. In some embodiments, the level of the target queue may be determined based on the length of the target queue in another manner. This is not limited in this embodiment of this application. For example, the switching device may substitute the length of the target queue into a formula, to obtain the level of the target queue. An input of the formula is the length of the queue, and an output of the formula is the level of the queue.

Descriptions are provided below in different aspects in the third example implementation. The third example implementation may have a solution different from solutions mentioned in the following aspects. Details are not described herein in this embodiment of this application.

In some embodiments, the switching device may determine, based on the level of the first data flow and the length of the target queue, the marking probability corresponding to the first data flow. If the level of the first data flow remains unchanged, when a marking probability determined based on a second queue length is greater than a marking probability determined based on a first queue length, it indicates that the second queue length is greater than the first queue length. It should be noted that if the level of the first data flow remains unchanged, when one queue length is greater than another queue length, a marking probability determined based on the one queue length is not necessarily greater than a marking probability determined based on the another queue length. Certainly, if the level of the first data flow remains unchanged, when one queue length is greater than another queue length, a marking probability determined based on the one queue length may be definitely greater than a marking probability determined based on the another queue length. To be specific, the length of the target queue may be positively correlated with the marking probability corresponding to the data flow. This is not limited in this embodiment of this application.

In some embodiments, the switching device may determine, based on the level of the first data flow and the level of the target queue, the marking probability corresponding to the first data flow. If the level of the first data flow remains unchanged, when a marking probability determined based on a second queue level is greater than a marking probability determined based on a first queue level, it indicates that the second queue level is greater than the first queue level. It should be noted that if the level of the first data flow remains unchanged, when one queue level is greater than another queue level, a marking probability determined based on the one queue level is not necessarily greater than a marking probability determined based on the another queue level. Certainly, if the level of the first data flow remains unchanged, when one queue level is greater than another queue level, a marking probability determined based on the one queue level may be definitely greater than a marking probability determined based on the another queue level. To be specific, the level of the target queue may be positively correlated with the marking probability corresponding to the data flow. This is not limited in this embodiment of this application.

In some embodiments, the switching device may determine, based on the target parameter and the level of the first data flow and the length and the level of the target queue, the marking probability corresponding to the first data flow.

When both the level of the first data flow and the level of the target queue remain unchanged, a relationship between the marking probability corresponding to the first data flow, the target parameter of the first data flow, and the length of the target queue meets at least one of the following:

if the target parameter of the first data flow remains unchanged, the marking probability corresponding to the first data flow increases as the length of the target queue increases; if the length of the target queue remains unchanged, the marking probability corresponding to the first data flow increases as the target parameter of the first data flow increases; if the target parameter of the first data flow remains unchanged, the marking probability corresponding to the first data flow remains unchanged as the length of the target queue increases; and if the length of the target queue remains unchanged, the marking probability corresponding to the first data flow remains unchanged as the target parameter of the first data flow increases.

The foregoing lists four relationships between the marking probability corresponding to the first data flow, the target parameter of the first data flow, and the length of the target queue. In some embodiments, any two of the four relationships may be combined when logic is correct. Details are not described herein in this embodiment of this application.

It should be noted that when determining, based on the target parameter and the level of the first data flow and the length and the level of the target queue, the marking probability corresponding to the first data flow, the switching device may determine, according to a formula, the marking probability corresponding to the first data flow. When the marking probability corresponding to the first data flow is positively correlated with at least one of the target parameter of the first data flow and the length of the target queue, the formula may be obtained by setting, according to the first formula in the embodiment shown in FIG. 5, $Q(i, j)$ to a function positively correlated with at least one of the target parameter of the first data flow and the length of the target queue. When the marking probability corresponding to the first data flow does not change with the target parameter of the first data flow and the length of the target queue, the formula may be obtained by setting $Q(i, j)$ to a constant according to the first formula in the embodiment shown in FIG. 5.

In a fourth example implementation, when determining, based on at least one of the target parameter and the auxiliary parameter of the first data flow, the marking probability corresponding to the first data flow, the switching device may determine, based on a parameter different from both the target parameter and the auxiliary parameter, the marking probability corresponding to the first data flow. For example, the switching device may determine, based on at least one of the target parameter and the auxiliary parameter (for example, the level) of the first data flow and at least one of a transmission rate of the first data flow and a transmission rate level of the first data flow, the marking probability corresponding to the first data flow.

The transmission rate level of the first data flow is related to the transmission rate of the first data flow. For example, when a second transmission rate level is greater than a first transmission rate level, it indicates that a second transmission rate is greater than a first transmission rate. To be specific, a higher transmission rate level indicates a higher transmission rate related to the transmission rate level. However, when one transmission rate is greater than another transmission rate, a transmission rate level related to the one transmission rate is not necessarily greater than a transmission rate level related to the another transmission rate. For example, the transmission rate of the first data flow falls within one of a plurality of transmission rate ranges, the plurality of transmission rate ranges are in a one-to-one correspondence with a plurality of transmission rate levels, and the transmission rate level of the first data flow is a transmission rate level that is in the plurality of transmission rate levels and that corresponds to the one transmission rate range.

When determining the transmission rate level of the first data flow, the switching device may first search the plurality of transmission rate ranges for one transmission rate range within which the transmission rate of the first data flow falls. In some embodiments, the switching device may search the one-to-one correspondence between the plurality of transmission rate ranges and the plurality of transmission rate levels for a transmission rate level corresponding to the one transmission rate range, and use the transmission rate level as the transmission rate level of the first data flow. Certainly, when one transmission rate is greater than another transmission rate, a transmission rate level related to the one transmission rate may be definitely greater than a transmission rate level related to the another transmission rate. To be specific, the transmission rate level is positively correlated with the transmission rate. This is not limited in this embodiment of this application.

In some embodiments, the transmission rate level of the first data flow may be determined based on the transmission rate of the first data flow in another manner. This is not limited in this embodiment of this application. For example, the switching device may substitute the transmission rate of the first data flow into a formula, to obtain the transmission rate level of the first data flow. An input of the formula is the transmission rate of the data flow, and an output of the formula is the transmission rate level of the data flow.

Descriptions are provided below in different aspects in the fourth example implementation. The fourth example implementation may have a solution different from solutions mentioned in the following aspects. Details are not described herein in this embodiment of this application.

In some embodiments, the switching device may determine, based on the target parameter of the first data flow and the transmission rate of the first data flow, the marking probability corresponding to the first data flow. If the target parameter of the first data flow remains unchanged, when a marking probability determined based on a second transmission rate is greater than a marking probability determined based on a first transmission rate, it indicates that the second transmission rate is greater than the first transmission rate. It should be noted that if the target parameter of the first data flow remains unchanged, when one transmission rate is greater than another transmission rate, a marking probability determined based on the one transmission rate is not necessarily greater than a marking probability determined based on the another transmission rate. Certainly, if the target parameter of the first data flow remains unchanged, when one transmission rate is greater than another transmission rate, a marking probability determined based on the one transmission rate may be definitely greater than a marking probability determined based on the another transmission rate. To be specific, the transmission rate may be positively correlated with the marking probability corresponding to the data flow. This is not limited in this embodiment of this application.

In some embodiments, the switching device may determine, based on the level of the first data flow and the transmission rate level of the first data flow, the marking probability corresponding to the first data flow. If the level of the first data flow remains unchanged, when a marking probability determined based on a second transmission rate level is greater than a marking probability determined based on a first transmission rate level, it indicates that the second transmission rate is greater than the first transmission rate. It should be noted that if the level of the first data flow remains unchanged, when one transmission rate level is greater than another transmission rate level, a marking probability determined based on the one transmission rate level is not necessarily greater than a marking probability determined based on the another transmission rate level. Certainly, if the level of the first data flow remains unchanged, when one transmission rate level is greater than another transmission rate level, a marking probability determined based on the one transmission rate level may be definitely greater than a transmission rate level determined based on the another marking probability. To be specific, the transmission rate level may be positively correlated with the marking probability corresponding to the data flow. This is not limited in this embodiment of this application.

In some embodiments, the switching device may determine, based on the target parameter and the level of the first data flow, the transmission rate of the first data flow, and the transmission rate level of the first data flow, the marking probability corresponding to the first data flow.

When both the level of the first data flow and the transmission rate level of the first data flow remain unchanged, a relationship between the marking probability corresponding to the first data flow, the target parameter of the first data flow, and the transmission rate of the first data flow meets at least one of the following:

if the target parameter of the first data flow remains unchanged, the marking probability corresponding to the first data flow increases as the transmission rate of the first data flow increases; if the transmission rate of the first data flow remains unchanged, the marking probability corresponding to the first data flow increases as the target parameter of the first data flow increases; if the target parameter of the first data flow remains unchanged, the marking probability corresponding to the first data flow remains unchanged as the transmission rate of the first data flow increases; and if the transmission rate of the first data flow remains unchanged, the marking probability corresponding to the first data flow remains unchanged as the target parameter of the first data flow increases.

The foregoing lists four relationships between the marking probability corresponding to the first data flow, the target parameter of the first data flow, and the transmission rate of the first data flow. In some embodiments, any two of the four relationships may be combined when logic is correct. Details are not described herein in this embodiment of this application.

In a fifth example implementation, when determining, based on at least one of the target parameter and an auxiliary parameter of the first data flow, the marking probability corresponding to the first data flow, the switching device may determine, based on a parameter different from both the target parameter and the auxiliary parameter, the marking probability corresponding to the first data flow. For example, the switching device may determine, based on at least one of the target parameter and the auxiliary parameter (for example, the level) of the first data flow, at least one of the length and a level of the target queue, and at least one of a transmission rate of the first data flow and a transmission rate level of the first data flow, the marking probability corresponding to the first data flow.

For a relationship between the level of the target queue and the length of the target queue, refer to the descriptions in the third example implementation. For a relationship between the transmission rate level of the first data flow and the transmission rate of the first data flow, refer to the descriptions in the fourth example implementation. Details are not described herein in this embodiment of this application.

Descriptions are provided below in different aspects in the fifth example implementation. The fifth example implementation may have a solution different from solutions mentioned in the following aspects. Details are not described herein in this embodiment of this application.

In some embodiments, the switching device may determine, based on the target parameter of the first data flow, the length of the target queue, and the transmission rate of the first data flow, the marking probability corresponding to the first data flow.

If both the target parameter of the first data flow and the length of the target queue remain unchanged, when a marking probability determined based on a second transmission rate is greater than a marking probability determined based on a first transmission rate, it indicates that the second transmission rate is greater than the first transmission rate. It should be noted that if both the target parameter of the first data flow and the length of the target queue remain unchanged, when one transmission rate is greater than another transmission rate, a marking probability determined based on the one transmission rate is not necessarily greater than a marking probability determined based on the another transmission rate. Certainly, if both the target parameter of the first data flow and the length of the target queue remain unchanged, when one transmission rate is greater than another transmission rate, a marking probability determined based on the one transmission rate may be definitely greater than a marking probability determined based on the another transmission rate. To be specific, the transmission rate may be positively correlated with the marking probability corresponding to the data flow. This is not limited in this embodiment of this application.

If both the target parameter of the first data flow and the transmission rate of the first data flow remain unchanged, when a marking probability determined based on a second queue length is greater than a marking probability determined based on a first queue length, it indicates that the second queue length is greater than the first queue length. It should be noted that if both the target parameter of the first data flow and the transmission rate of the first data flow remain unchanged, when one queue length is greater than another queue length, a marking probability determined based on the one queue length is not necessarily greater than a marking probability determined based on the another queue length. Certainly, if both the target parameter of the first data flow and the transmission rate of the first data flow remain unchanged, when one queue length is greater than another queue length, a marking probability determined based on the one queue length may be definitely greater than a marking probability determined based on the another queue length. To be specific, the queue length may be positively correlated with the marking probability corresponding to the data flow. This is not limited in this embodiment of this application.

In some embodiments, the switching device may determine, based on the level of the first data flow, the level of the target queue, and the transmission rate level of the first data flow, the marking probability corresponding to the first data flow.

If both the level of the first data flow and the level of the target queue remain unchanged, when a marking probability determined based on a second transmission rate level is greater than a marking probability determined based on a first transmission rate level, the second transmission rate level is greater than the first transmission rate level. It should be noted that if both the level of the first data flow and the level of the target queue remain unchanged, when one transmission rate level is greater than another transmission rate level, a marking probability determined based on the one transmission rate level is not necessarily greater than a marking probability determined based on the another transmission rate level. Certainly, if both the level of the first data flow and the level of the target queue remain unchanged, when one transmission rate level is greater than another transmission rate level, a transmission rate level determined based on the one transmission rate level may be definitely higher than a transmission rate level determined based on the another transmission rate level. To be specific, the transmission rate level may be positively correlated with the marking probability corresponding to the data flow. This is not limited in this embodiment of this application.

If both the level of the first data flow and the transmission rate level of the first data flow remain unchanged, when a marking probability determined based on a second queue level is greater than a marking probability determined based on a first queue level, the second queue level is greater than the first queue level. It should be noted that if both the level of the first data flow and the transmission rate level of the first data flow remain unchanged, when one queue level is greater than another queue level, a marking probability determined based on the one queue level is not necessarily greater than a marking probability determined based on the another queue level. Certainly, if both the level of the first data flow and the transmission rate level of the first data flow remain unchanged, when one queue level is greater than another queue level, a transmission rate level determined based on the one queue level may be definitely greater than a transmission rate level determined based on the another queue level. To be specific, the queue level may be positively correlated with the marking probability corresponding to the data flow. This is not limited in this embodiment of this application.

In some embodiments, the switching device may determine, based on the target parameter and the level of the first data flow, the length and the level of the target queue, the transmission rate of the first data flow, and the transmission rate level of the first data flow, the marking probability corresponding to the first data flow.

When the level of the first data flow, the level of the target queue, and the transmission rate level of the first data flow all remain unchanged, a relationship between the marking probability corresponding to the first data flow, the length of the target queue, the target parameter of the first data flow, and the transmission rate of the first data flow meets at least one of the following:

if the target parameter of the first data flow and the length of the target queue remain unchanged, the marking probability corresponding to the first data flow increases as the transmission rate of the first data flow increases; if the target parameter of the first data flow and the transmission rate of the first data flow remain unchanged, the marking probability corresponding to the first data flow increases as the length of the target queue increases; if the transmission rate of the first data flow and the length of the target queue remain unchanged, the marking probability corresponding to the first data flow increases as the target parameter of the first data flow increases; if the target parameter of the first data flow and the length of the target queue remain unchanged, the marking probability corresponding to the first data flow remains unchanged as the transmission rate of the first data flow increases; if the target parameter of the first data flow and the transmission rate of the first data flow remain unchanged, the marking probability corresponding to the first data flow remains unchanged as the length of the target queue increases; and if the transmission rate of the first data flow and the length of the target queue remain unchanged, the marking probability corresponding to the first data flow remains unchanged as the target parameter of the first data flow increases.

The foregoing lists six relationships between the marking probability corresponding to the first data flow, the length of the target queue, the target parameter of the first data flow, and the transmission rate of the first data flow. In some embodiments, any plurality of relationships (for example, any two relationships or any three relationships) in the six relationships may be combined when logic is correct. Details are not described herein in this embodiment of this application.

In some embodiments, in this embodiment of this application, before determining the marking probability corresponding to the first data flow, the switching device may first determine whether the first data flow meets the marking condition. For example, before determining, based on at least one of the target parameter and the auxiliary parameter of the first data flow, the marking probability corresponding to the first data flow, the switching device determines whether the first data flow meets the marking condition. In some embodiments, before determining, based on at least one of the target parameter and the auxiliary parameter of the first data flow and at least one parameter different from both the target parameter and the auxiliary parameter, the marking probability corresponding to the first data flow, the switching device determines whether the first data flow meets the marking condition. In a case of determining performed based on the marking condition, a probability of performing congestion marking on the data packet in the first data flow can be reduced in some cases in which the marking condition is met, to reduce a delay of the first data flow.

For example, the marking condition may be any condition related to a condition for marking the data packet.

For example, the marking condition may include: the level of the first data flow does not belong to q lower levels in a plurality of specified data flow levels, where q≥1. The plurality of specified data flow levels may be the same as or different from the plurality of data flow levels in operation 404. This is not limited in this embodiment of this application. When the marking condition is met, it indicates that the amount of the data in the first data flow is relatively small, and the first data flow is not a data flow that causes congestion on the switching device. In this case, the first data flow does not need to be marked, to reduce a delay of the first data flow.

For another example, the marking condition may include: the transmission rate of the first data flow is greater than a transmission rate threshold. The transmission rate threshold is a constant or a variable. To be specific, the transmission rate may be a fixed value or a variable related to some parameters (for example, a quantity of target ports). In some embodiments, the transmission rate threshold may be the fair bandwidth in the embodiment shown in FIG. 5. In some embodiments, when the transmission rate threshold is the constant, the transmission rate threshold may support a technician in changing the transmission rate threshold. When the marking condition is met, it indicates that the transmission rate of the first data flow is relatively low, and the first data flow is not a data flow that causes congestion on the switching device. In this case, the first data flow does not need to be marked, to reduce a delay of the first data flow.

Figure 11:
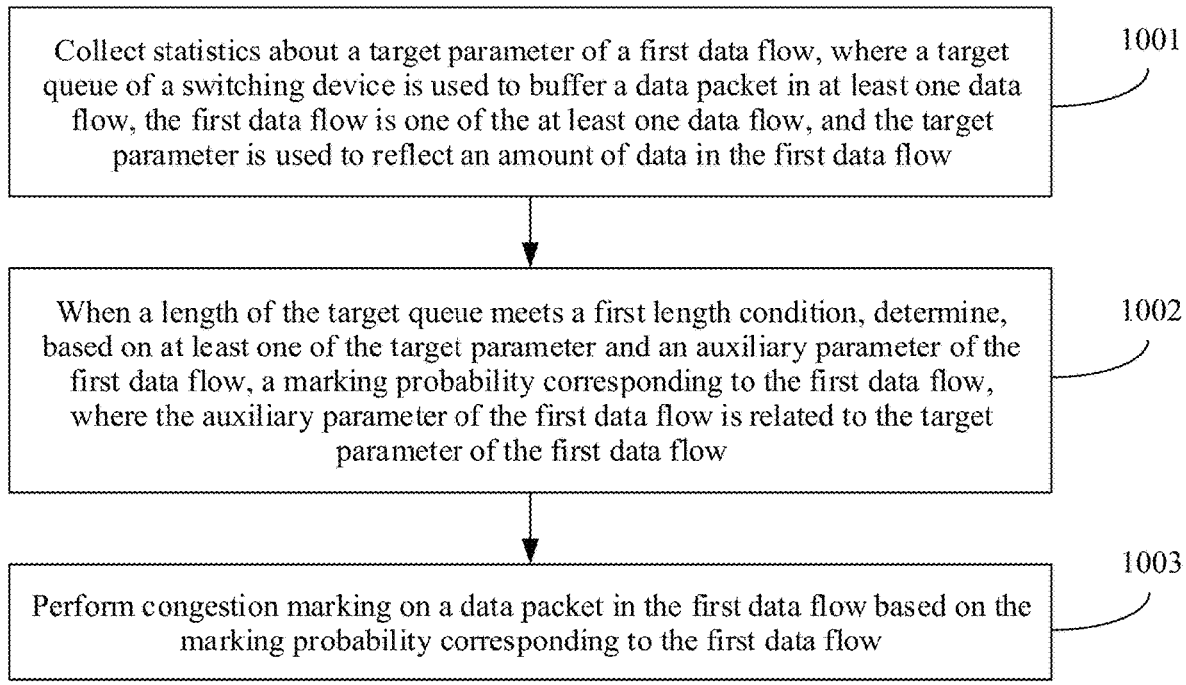
FIG. 11 is a flowchart of still another data packet marking method according to an embodiment of this application.

For example, FIG. 11 is a flowchart of still another data packet marking method according to an embodiment of this application. The method may be applied to the switching device 02 in the data transmission system shown in FIG. 1. As shown in FIG. 11, the data packet marking method may include the following operations.

Operation 1001: Collect statistics about a target parameter of a first data flow, where a target queue of the switching device is used to buffer a data packet in at least one data flow, the first data flow is one of the at least one data flow, and the target parameter is used to reflect an amount of data in the first data flow.

In this embodiment of this application, for operation 1001, refer to operation 301. Details are not described herein in this embodiment of this application.

Operation 1002: When a length of the target queue meets a first length condition, determine, based on at least one of the target parameter and an auxiliary parameter of the first data flow, a marking probability corresponding to the first data flow, where the auxiliary parameter of the first data flow is related to the target parameter of the first data flow.

In this embodiment of this application, for explanations of the first length condition, refer to the explanations of the first length condition in the embodiment shown in FIG. 4 or FIG. 5. Details are not described herein in this embodiment of this application.

When determining that the length of the target queue meets the first length condition, the switching device may determine, based on at least one of the target parameter and the auxiliary parameter of the first data flow, the marking probability corresponding to the first data flow. It should be noted that the marking probability that corresponds to the first data flow and that is determined in operation 1102 may be 0 or may be greater than 0. This is not limited in this embodiment of this application.

Operation 1003: Perform congestion marking on a data packet in the first data flow based on the marking probability corresponding to the first data flow.

It should be noted that when the marking probability corresponding to the first data flow is greater than 0, the switching device may perform congestion marking on the data packet in the first data flow based on the marking probability corresponding to the first data flow. In some embodiments, a probability that congestion marking is performed on the data packet in the first data flow may be equal to the marking probability corresponding to the first data flow. When the marking probability corresponding to the first data flow is 0, the switching device may not perform congestion marking on the data packet in the first data flow.

In conclusion, in the data packet marking method provided in this embodiment of this application, when the switching device determines that the length of the target queue meets the first length condition, it indicates that the target queue is relatively long. In this case, the switching device may determine, based on at least one of the target parameter and the auxiliary parameter of the first data flow, the marking probability corresponding to the first data flow, to perform congestion marking on the data packet in the first data flow based on at least one of the target parameter and the auxiliary parameter of the first data flow, and to reduce a probability of performing congestion marking on all data flows, so that transmission efficiency of all the data flows can be prevented from being reduced, and a delay caused to all the data flows can be avoided.

In some embodiments, in this application, performing congestion marking on the data packet in the first data flow may include: performing ECN marking on the data packet in the first data flow, recording a congestion value that can reflect congestion in the data packet in the first data flow, or recording other information that reflects congestion in the data packet in the first data flow.

Figure 12:
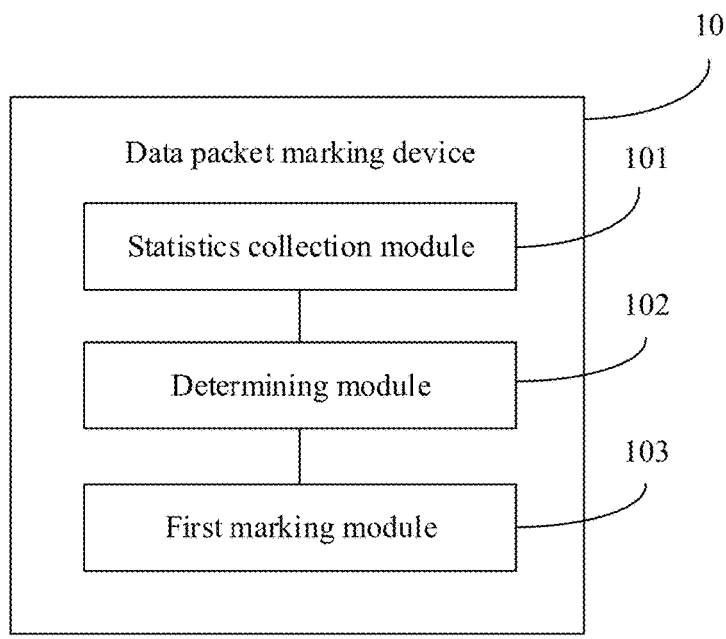
FIG. 12 is a schematic structural diagram of a data packet marking device according to an embodiment of this application.

FIG. 12 is a schematic structural diagram of a data packet marking device according to an embodiment of this application. The data packet marking device may be applied to the switching device in FIG. 1. As shown in FIG. 12, the data packet marking device 10 may include:

a statistics collection module 101, configured to collect statistics about a target parameter of a first data flow, where a target queue of the switching device is used to buffer a data packet in at least one data flow, the first data flow is any one of the at least one data flow, the target queue includes a receive queue or a transmit queue, and the target parameter is used to reflect an amount of data in the first data flow;

a determining module 102, configured to: when a length of the target queue meets a first length condition, determine, based on the target parameter of the first data flow, whether the first data flow meets a marking condition, where the first length condition includes: the length of the target queue is greater than a first length threshold, a target parameter of a data flow that meets the marking condition is greater than a first target parameter threshold, and the first length threshold and the first target parameter threshold each are greater than 0; and a first marking module 103 is configured to: when the first data flow meets the marking condition, perform explicit congestion notification ECN marking on at least one data packet in the first data flow.

In conclusion, in the data packet marking device provided in this embodiment of this application, when the determining module determines that the first data flow meets the marking condition, it indicates that the target queue is relatively long, and most data in the target queue is data in the first data flow. Therefore, a data flow that causes congestion on the switching device includes the first data flow. In this case, the first marking module needs to perform ECN marking on the data packet in the first data flow, to reduce a transmission rate of the first data flow, eliminate congestion on the switching device, and improve transmission efficiency of another data flow. In some embodiments, when the switching device determines that the first data flow does not meet the marking condition, it indicates that although the entire target queue is relatively long, most data in the target queue is not data in the first data flow. Therefore, a data flow that causes congestion on the switching device does not include the first data flow. In this case, the switching device does not need to perform ECN marking on the data packet in the first data flow. In this way, when the length of the target queue is relatively long, ECN marking can be prevented from being performed on a data flow with a relatively small amount of data, and therefore transmission efficiency of the data flow with the relatively small amount of data is not reduced, and a delay is not caused to the data flow with the relatively small amount of data.

In some embodiments, the target parameter includes a quantity of bytes, and the first target parameter threshold includes a byte quantity threshold. In some embodiments, the target parameter includes a quantity of data packets, and the first target parameter threshold includes a data packet quantity threshold.

In some embodiments, the first length condition includes: the length of the target queue is less than or equal to a second length threshold, and the second length threshold is less than infinity.

Figure 13:
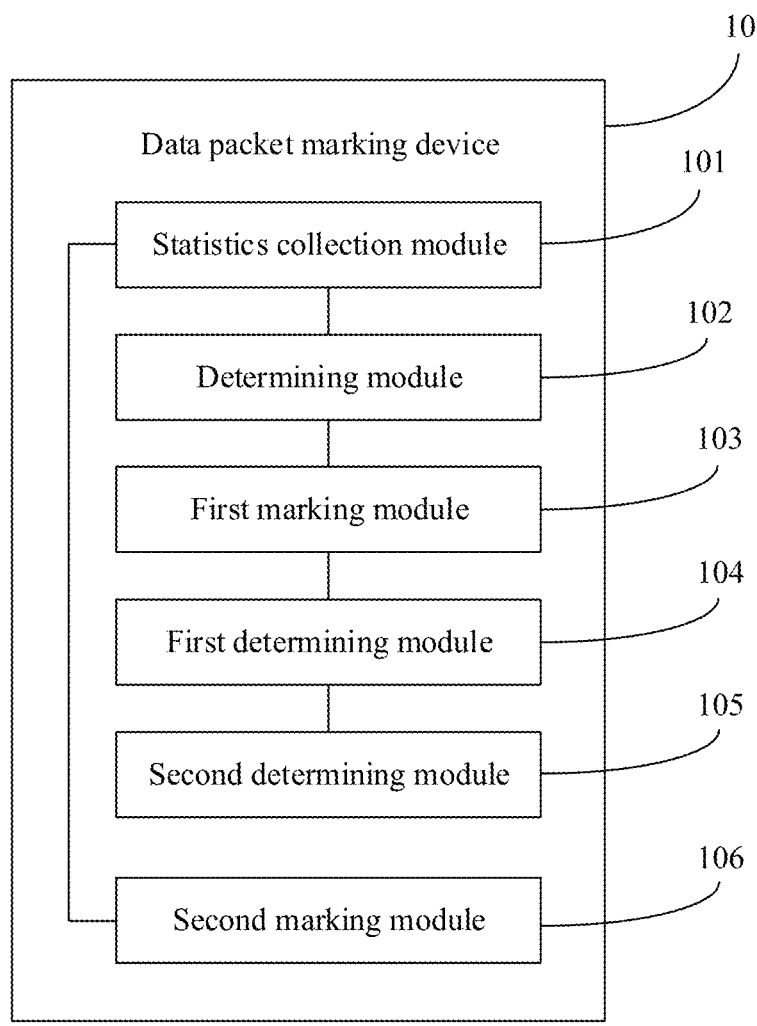
FIG. 13 is a schematic structural diagram of another data packet marking device according to an embodiment of this application.

FIG. 13 is a schematic structural diagram of another data packet marking device according to an embodiment of this application. As shown in FIG. 13, based on FIG. 12, the data packet marking device 10 may include:

a first determining module 104, configured to: when the length of the target queue meets the first length condition, determine a level of the first data flow in a plurality of data flow levels based on the target parameter of the first data flow.

The level of the data flow is positively correlated with the target parameter of the data flow, and the marking condition includes: the level of the data flow is a non-lowest level in the plurality of data flow levels.

In some embodiments, the first determining module 104 is configured to determine the level of the first data flow based on the target parameter of the first data flow and a one-to-one correspondence between m+1 target parameter ranges and the plurality of data flow levels, where m≥1, the m+1 target parameter ranges are obtained through division based on m target parameter thresholds, a minimum target parameter threshold in the m target parameter thresholds is the first target parameter threshold, and a data flow level corresponding to the target parameter range is positively correlated with a target parameter in the target parameter range.

Figure 14:
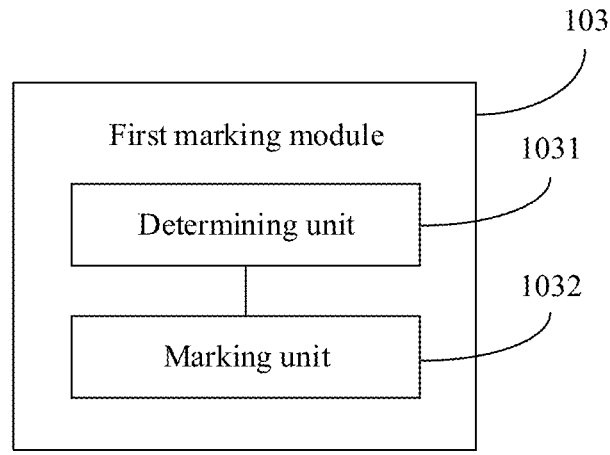
FIG. 14 is a schematic structural diagram of a first marking module according to an embodiment of this application.

In some embodiments, FIG. 14 is a schematic structural diagram of a first marking module according to an embodiment of this application. As shown in FIG. 14, the first marking module 103 may include:

a determining unit 1031, configured to determine a marking probability corresponding to the first data flow, where the marking probability corresponding to the data flow is positively correlated with the level of the data flow; and a marking unit 1032, configured to perform ECN marking on the data packet in the first data flow based on the marking probability corresponding to the first data flow.

In some embodiments, still referring to FIG. 13, the data packet marking device 10 may include:

a second determining module 105, configured to: when the first data flow meets the marking condition, determine, from n+1 length ranges, a target length range within which the length of the target queue falls.

Herein, n≥1, the n+1 length ranges are obtained through division based on n length thresholds, a minimum length threshold in the n length thresholds is the first length threshold, and a maximum length threshold in the n length thresholds is the second length threshold. The marking probability corresponding to the data flow is positively correlated with the length in the target length range.

In some embodiments, the determining unit 1031 in FIG. 14 may be configured to:

determine, according to a first formula, the level of the first data flow, and the target length range, the marking probability corresponding to the first data flow, where the first formula includes: $P(j,i)=P(j-1,i)+Q(i,j)*(L-L_j)/(L_{j+1}-L_j)$.

Herein, $L_j$ represents a $j^{th}$ length threshold arranged in ascending order of the n length thresholds, where 1≤j≤n; $L_{j+1}$ represents a $(j+1)^{th}$ length threshold arranged in ascending order of the n length thresholds; L represents the length of the target queue; P(j,i) represents a marking probability corresponding to an $i^{th}$ level of data flow in the at least one data flow when L falls within $(L_j, L_{j+1}]$, where 1≤i≤m+1; when j−1>0, P(j−1,i) represents a marking probability corresponding to the $i^{th}$ level of data flow in the at least one data flow when L falls within $(L_{j-1}, L_j]$; when j−1=0, P(j−1,i)=0; Q(i, j) represents a marking coefficient of the $i^{th}$ level of data flow when L falls within $(L_j, L_{j+1}]$; and Q(1, j)=0, and $$\sum_{j=1}^{n} Q(i, j) \le 1.$$

In some embodiments, the marking condition includes: a transmission rate of the data flow is greater than fair bandwidth, and the fair bandwidth is positively correlated with bandwidth of a target port.

When the target queue is the transmit queue, the transmission rate is a rate at which the switching device sends the data flow, and the target port is a transmit port that is in the switching device and that is used to send a data packet buffered into the target queue.

When the target queue is the receive queue, the transmission rate is a rate at which the switching device receives the data flow, and the target port is a receive port that is in the switching device and that is used to receive a data packet buffered into the target queue.

In some embodiments, the fair bandwidth is negatively correlated with a target quantity. The target quantity is a quantity of data flows whose levels belong to a level set in the at least one data flow, the level set includes p higher levels in the plurality of data flow levels, and the level of the data flow is positively correlated with the target parameter of the data flow, where 1≤p.

In some embodiments, the fair bandwidth is equal to a ratio of the bandwidth of the target port to the target quantity.

In some embodiments, still referring to FIG. 13, the data packet marking device 10 may include a second marking module 106, configured to: when the length of the target queue meets a second length condition, perform ECN marking on each data packet in the first data flow, where the second length condition includes: the length of the target queue is greater than the second length threshold.

In conclusion, in the data packet marking device provided in this embodiment of this application, when the determining module determines that the first data flow meets the marking condition, it indicates that the target queue is relatively long, and most data in the target queue is data in the first data flow. Therefore, a data flow that causes congestion on the switching device includes the first data flow. In this case, the first marking module needs to perform ECN marking on the data packet in the first data flow, to reduce a transmission rate of the first data flow, eliminate congestion on the switching device, and improve transmission efficiency of another data flow. In some embodiments, when the switching device determines that the first data flow does not meet the marking condition, it indicates that although the entire target queue is relatively long, most data in the target queue is not data in the first data flow. Therefore, a data flow that causes congestion on the switching device does not include the first data flow. In this case, the switching device does not need to perform ECN marking on the data packet in the first data flow. In this way, when the length of the target queue is relatively long, ECN marking can be prevented from being performed on a data flow with a relatively small amount of data, and therefore transmission efficiency of the data flow with the relatively small amount of data is not reduced, and a delay is not caused to the data flow with the relatively small amount of data.

Figure 15:
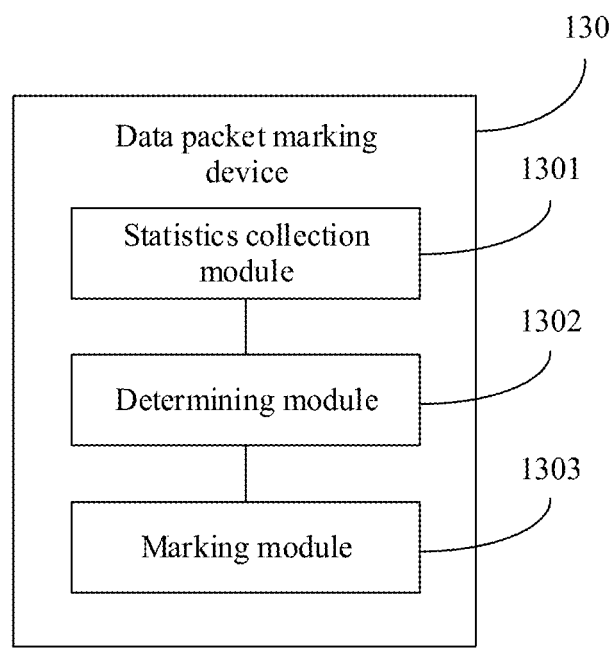
FIG. 15 is a schematic structural diagram of still another data packet marking device according to an embodiment of this application.

FIG. 15 is a schematic structural diagram of still another data packet marking device according to an embodiment of this application. The data packet marking device may be applied to the switching device in FIG. 1. As shown in FIG. 15, the data packet marking device 130 may include:

- a statistics collection module 1301, configured to collect statistics about a target parameter of a first data flow, where a target queue of the switching device is used to buffer a data packet in at least one data flow, the first data flow is one of the at least one data flow, and the target parameter is used to reflect an amount of data in the first data flow;
- a determining module 1302, configured to: when a length of the target queue meets a first length condition, determine, based on at least one of the target parameter and an auxiliary parameter of the first data flow, a marking probability corresponding to the first data flow, where the auxiliary parameter of the first data flow is related to the target parameter of the first data flow; and
- a marking module 1303, configured to perform congestion marking on a data packet in the first data flow based on the marking probability corresponding to the first data flow.

In conclusion, in the data packet marking device provided in this embodiment of this application, when the determining module determines that the length of the target queue meets the first length condition, it indicates that the target queue is relatively long. In this case, the determining module may determine, based on at least one of the target parameter and the auxiliary parameter of the first data flow, the marking probability corresponding to the first data flow, to perform congestion marking on the data packet in the first data flow based on at least one of the target parameter and the auxiliary parameter of the first data flow, and to reduce a probability of performing congestion marking on all data flows, so that transmission efficiency of all the data flows can be prevented from being reduced, and a delay caused to all the data flows can be avoided.

In some embodiments, the auxiliary parameter includes a level of the first data flow.

In some embodiments, the determining module 1302 is configured to determine, based on the target parameter of the first data flow, the marking probability corresponding to the first data flow, where when a marking probability determined based on a second target parameter is greater than a marking probability determined based on a first target parameter, the second target parameter is greater than the first target parameter.

In some embodiments, the determining module 1302 is configured to determine, based on the level of the first data flow, the marking probability corresponding to the first data flow, where when a marking probability determined based on a second flow level is greater than a marking probability determined based on a first flow level, the second flow level is greater than the first flow level.

In some embodiments, the determining module 1302 is configured to determine, based on the target parameter and the level of the first data flow, the marking probability corresponding to the first data flow, where when the level of the first data flow remains unchanged, the marking probability corresponding to the first data flow increases as the target parameter of the first data flow increases, or the marking probability corresponding to the first data flow remains unchanged as the target parameter of the first data flow increases.

In some embodiments, when a second flow level related to a second target parameter is greater than a first flow level related to a first target parameter, the second target parameter is greater than the first target parameter.

In some embodiments, the target parameter of the first data flow falls within one of a plurality of target parameter ranges, the plurality of target parameter ranges are in a one-to-one correspondence with a plurality of data flow levels, and the level of the first data flow is a data flow level that is in the plurality of data flow levels and that corresponds to the one target parameter range.

Figure 16:
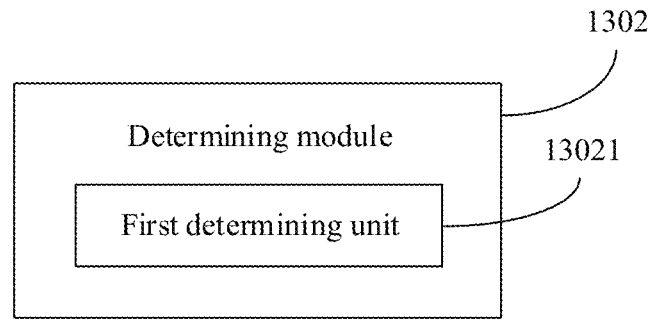
FIG. 16 is a schematic structural diagram of a determining module according to an embodiment of this application.

In an implementable, as shown in FIG. 16, the determining module 1302 includes a first determining unit 13021, configured to determine, based on at least one of the target parameter and the level of the first data flow and at least one of the length and a level of the target queue, the marking probability corresponding to the first data flow, where the level of the target queue is related to the length of the target queue.

In some embodiments, the first determining unit 13021 is configured to determine, based on the level of the first data flow and the length of the target queue, the marking probability corresponding to the first data flow, where if the level of the first data flow remains unchanged, when a marking probability determined based on a second queue length is greater than a marking probability determined based on a first queue length, the second queue length is greater than the first queue length.

In some embodiments, the first determining unit 13021 is configured to determine, based on the level of the first data flow and the level of the target queue, the marking probability corresponding to the first data flow, where if the level of the first data flow remains unchanged, when a marking probability determined based on a second queue level is greater than a marking probability determined based on a first queue level, the second queue level is greater than the first queue level.

In some embodiments, the first determining unit 13021 is configured to determine, based on the target parameter and the level of the first data flow and the length and the level of the target queue, the marking probability corresponding to the first data flow, where when both the level of the first data flow and the level of the target queue remain unchanged, a relationship between the marking probability corresponding to the first data flow, the target parameter of the first data flow, and the length of the target queue meets at least one of the following: if the target parameter of the first data flow remains unchanged, the marking probability corresponding to the first data flow increases as the length of the target queue increases; and if the length of the target queue remains unchanged, the marking probability corresponding to the first data flow increases as the target parameter of the first data flow increases.

In some embodiments, when both the level of the first data flow and the level of the target queue remain unchanged, a relationship between the marking probability corresponding to the first data flow, the target parameter of the first data flow, and the length of the target queue meets at least one of the following: if the target parameter of the first data flow remains unchanged, the marking probability corresponding to the first data flow remains unchanged as the length of the target queue increases; and if the length of the target queue remains unchanged, the marking probability corresponding to the first data flow remains unchanged as the target parameter of the first data flow increases.

In some embodiments, when a second queue level related to a second queue length is greater than a first queue level related to a first queue length, the second queue length is greater than the first queue length.

In some embodiments, the length of the target queue falls within one of a plurality of length ranges, the plurality of length ranges are in a one-to-one correspondence with a plurality of queue levels, and the level of the target queue is a queue level that is in the plurality of queue levels and that corresponds to the one length range.

Figure 17:
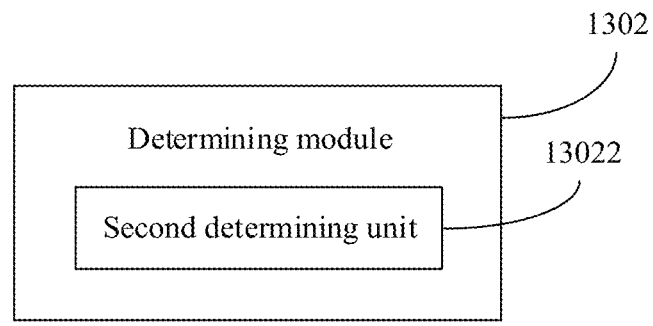
FIG. 17 is a schematic structural diagram of another determining module according to an embodiment of this application.

In an implementable, as shown in FIG. 17, the determining module 1302 includes a second determining unit 13022, configured to determine, based on at least one of the target parameter and the level of the first data flow and at least one of a transmission rate of the first data flow and a transmission rate level of the first data flow, the marking probability corresponding to the first data flow, where the transmission rate level of the first data flow is related to the transmission rate of the first data flow.

In some embodiments, the second determining unit 13022 is configured to determine, based on the target parameter of the first data flow and the transmission rate of the first data flow, the marking probability corresponding to the first data flow, where if the target parameter of the first data flow remains unchanged, when a marking probability determined based on a second transmission rate is greater than a marking probability determined based on a first transmission rate, the second transmission rate is greater than the first transmission rate.

In some embodiments, the second determining unit 13022 is configured to determine, based on the level of the first data flow and the transmission rate level of the first data flow, the marking probability corresponding to the first data flow, where if the level of the first data flow remains unchanged, when a marking probability determined based on a second transmission rate level is greater than a marking probability determined based on a first transmission rate level, the second transmission rate level is greater than the first transmission rate level.

In some embodiments, the second determining unit 13022 is configured to determine, based on the target parameter and the level of the first data flow, the transmission rate of the first data flow, and the transmission rate level of the first data flow, the marking probability corresponding to the first data flow.

When both the level of the first data flow and the transmission rate level of the first data flow remain unchanged, a relationship between the marking probability corresponding to the first data flow, the target parameter of the first data flow, and the transmission rate of the first data flow meets at least one of the following: if the target parameter of the first data flow remains unchanged, the marking probability corresponding to the first data flow increases as the transmission rate of the first data flow increases; and if the transmission rate of the first data flow remains unchanged, the marking probability corresponding to the first data flow increases as the target parameter of the first data flow increases.

In some embodiments, when both the level of the first data flow and the transmission rate level of the first data flow remain unchanged, a relationship between the marking probability corresponding to the first data flow, the target parameter of the first data flow, and the transmission rate of the first data flow meets at least one of the following: if the target parameter of the first data flow remains unchanged, the marking probability corresponding to the first data flow remains unchanged as the transmission rate of the first data flow increases; and if the transmission rate of the first data flow remains unchanged, the marking probability corresponding to the first data flow remains unchanged as the target parameter of the first data flow increases.

Figure 18:
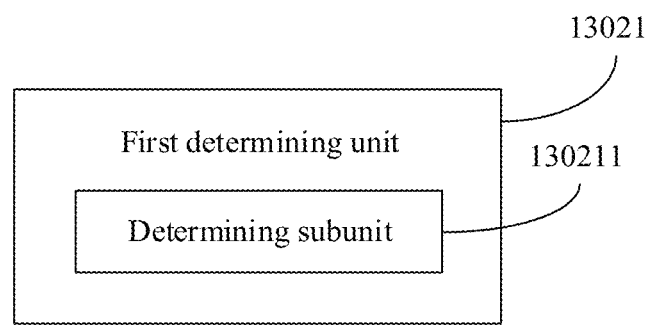
FIG. 18 is a schematic structural diagram of a first determining unit according to an embodiment of this application.

In an implementable, as shown in FIG. 18, the first determining unit 13021 includes a determining subunit 130211, configured to determine, based on at least one of the target parameter and the level of the first data flow, at least one of the length and the level of the target queue, and at least one of a transmission rate of the first data flow and a transmission rate level of the first data flow, the marking probability corresponding to the first data flow, where the level of the target queue is related to the length of the target queue, and the transmission rate level of the first data flow is related to the transmission rate of the first data flow.

In some embodiments, the determining subunit 130211 is configured to determine, based on the target parameter of the first data flow, the length of the target queue, and the transmission rate of the first data flow, the marking probability corresponding to the first data flow, where if both the target parameter of the first data flow and the length of the target queue remain unchanged, when a marking probability determined based on a second transmission rate is greater than a marking probability determined based on a first transmission rate, the second transmission rate is greater than the first transmission rate; and if both the target parameter of the first data flow and the transmission rate of the first data flow remain unchanged, when a marking probability determined based on a second queue length is greater than a marking probability determined based on a first queue length, the second queue length is greater than the first queue length.

In some embodiments, the determining subunit 130211 is configured to determine, based on the level of the first data flow, the level of the target queue, and the transmission rate level of the first data flow, the marking probability corresponding to the first data flow, where if both the level of the first data flow and the level of the target queue remain unchanged, when a marking probability determined based on a second transmission rate level is greater than a marking probability determined based on a first transmission rate level, the second transmission rate level is greater than the first transmission rate level; and if both the level of the first data flow and the transmission rate level of the first data flow remain unchanged, when a marking probability determined based on a second queue level is greater than a marking probability determined based on a first queue level, the second queue level is greater than the first queue level.

In some embodiments, the determining subunit 130211 is configured to determine, based on the target parameter and the level of the first data flow, the length and the level of the target queue, the transmission rate of the first data flow, and the transmission rate level of the first data flow, the marking probability corresponding to the first data flow.

When the level of the first data flow, the level of the target queue, and the transmission rate level of the first data flow all remain unchanged, a relationship between the marking probability corresponding to the first data flow, the length of the target queue, the target parameter of the first data flow, and the transmission rate of the first data flow meets at least one of the following: if the target parameter of the first data flow and the length of the target queue remain unchanged, the marking probability corresponding to the first data flow increases as the transmission rate of the first data flow increases; if the target parameter of the first data flow and the transmission rate of the first data flow remain unchanged, the marking probability corresponding to the first data flow increases as the length of the target queue increases; and if the transmission rate of the first data flow and the length of the target queue remain unchanged, the marking probability corresponding to the first data flow increases as the target parameter of the first data flow increases.

In some embodiments, when the level of the first data flow, the level of the target queue, and the transmission rate level of the first data flow all remain unchanged, a relationship between the marking probability corresponding to the first data flow, the length of the target queue, the target parameter of the first data flow, and the transmission rate of the first data flow meets at least one of the following: if the target parameter of the first data flow and the length of the target queue remain unchanged, the marking probability corresponding to the first data flow remains unchanged as the transmission rate of the first data flow increases; if the target parameter of the first data flow and the transmission rate of the first data flow remain unchanged, the marking probability corresponding to the first data flow remains unchanged as the length of the target queue increases; and if the transmission rate of the first data flow and the length of the target queue remain unchanged, the marking probability corresponding to the first data flow remains unchanged as the target parameter of the first data flow increases.

In some embodiments, when the second transmission rate level is greater than the first transmission rate level, the second transmission rate level is greater than the first transmission rate level.

In some embodiments, the transmission rate of the first data flow falls within one of a plurality of transmission rate ranges, the plurality of transmission rate ranges are in a one-to-one correspondence with a plurality of transmission rate levels, and the transmission rate level of the first data flow is a transmission rate level that is in the plurality of transmission rate levels and that corresponds to the one transmission rate range.

In some embodiments, the determining module 1302 is configured to: when the first data flow meets a marking condition, determine, based on at least one of the target parameter and the auxiliary parameter of the first data flow, the marking probability corresponding to the first data flow.

In some embodiments, the marking condition includes: the level of the first data flow does not belong to q lower levels in a plurality of specified data flow levels, where $q \geq 1$.

In some embodiments, the marking condition includes: the transmission rate of the first data flow is greater than a transmission rate threshold, and the transmission rate threshold is a constant or a variable.

In some embodiments, the target parameter includes a quantity of bytes or a quantity of data packets.

In conclusion, in the data packet marking device provided in this embodiment of this application, when the determining module determines that the length of the target queue meets the first length condition, it indicates that the target queue is relatively long. In this case, the determining module may determine, based on at least one of the target parameter and the auxiliary parameter of the first data flow, the marking probability corresponding to the first data flow, to perform congestion marking on the data packet in the first data flow based on at least one of the target parameter and the auxiliary parameter of the first data flow, and to reduce a probability of performing congestion marking on all data flows, so that transmission efficiency of all the data flows can be prevented from being reduced, and a delay caused to all the data flows can be avoided.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, all or some of the procedures or the functions according to the embodiments of this application are generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

Unless otherwise defined, a technical term or a scientific term used herein should have a general meaning understood by a person of ordinary skill in the art of this application. In the specification and claims of the patent application of this application, the terms "first", "second", and the like are not intended to indicate any order, quantity, or significance, but are intended to distinguish between different concepts. The term "a plurality of" means two or more, unless otherwise expressly limited.

The term "and/or" in this application describes only an association relationship for describing associated objects and indicates that three relationships may exist. For example, A and/or B may indicate the following three cases: Only A exists, both A and B exist, and only B exists. In some embodiments, the character "/" in this specification usually indicates an "or" relationship between the associated objects.

It should be noted that mutual reference may be made to the method embodiments provided in the embodiments of this application and the corresponding device embodiments. This is not limited in the embodiments of this application. A sequence of the operations of the method embodiments provided in the embodiments of this application can be properly adjusted, and the operations can be correspondingly added or deleted based on a situation. Any method that can be easily figured out by a person skilled in the art without departing from a technical scope disclosed in this application shall fall within the protection scope of this application, and therefore details are not described again.

The foregoing descriptions are only optional embodiments of this application, but are not intended to limit this application. Any modification, equivalent replacement, improvement, or the like made without departing from the principle of this application shall fall within the protection scope of this application.

What is claimed is:
1. A data packet marking method, applied to a switching device, wherein the method comprises:

collecting statistics about a target parameter of a first data flow, wherein a target queue of the switching device is used to buffer a data packet in the first data flow, wherein the target parameter is used to reflect an amount of data in the first data flow;

when a length of the target queue meets a first length condition, determining, based on at least one of the target parameter and an auxiliary parameter of the first data flow, a marking probability corresponding to the first data flow; and performing congestion marking on a data packet in the first data flow based on the marking probability corresponding to the first data flow, wherein the auxiliary parameter of the first data flow is related to the target parameter of the first data flow, the auxiliary parameter comprises a level of the first data flow, wherein the target parameter of the first data flow falls within one of a plurality of target parameter ranges, the plurality of target parameter ranges are in a one-to-one correspondence with a plurality of data flow levels, and the level of the first data flow is a data flow level that is in the plurality of data flow levels and that corresponds to one target parameter range.

2. The method of claim 1, wherein the determining, based on at least one of the target parameter and the auxiliary parameter of the first data flow, the marking probability corresponding to the first data flow comprises:

determining, based on the target parameter of the first data flow, the marking probability corresponding to the first data flow, wherein when a marking probability determined based on a second target parameter is greater than a marking probability determined based on a first target parameter, the second target parameter is greater than the first target parameter.

3. The method of claim 1, wherein the determining, based on at least one of the target parameter and the auxiliary parameter of the first data flow, the marking probability corresponding to the first data flow comprises:

determining, based on the level of the first data flow, the marking probability corresponding to the first data flow, wherein when a marking probability determined based on a second flow level is greater than a marking probability determined based on a first flow level, the second flow level is greater than the first flow level.

4. The method of claim 1, wherein the determining, based on at least one of the target parameter and the auxiliary parameter of the first data flow, the marking probability corresponding to the first data flow comprises:

determining, based on the target parameter and the level of the first data flow, the marking probability corresponding to the first data flow, wherein when the level of the first data flow remains unchanged, the marking probability corresponding to the first data flow increases as the target parameter of the first data flow increases, or the marking probability corresponding to the first data flow remains unchanged as the target parameter of the first data flow increases.

5. The method of claim 1, wherein when a second flow level related to a second target parameter is greater than a first flow level related to a first target parameter, the second target parameter is greater than the first target parameter.

6. The method of claim 1, wherein the determining, based on at least one of the target parameter and the auxiliary parameter of the first data flow, the marking probability corresponding to the first data flow comprises:

determining, based on at least one of the target parameter and the level of the first data flow and at least one of the length and a level of the target queue, the marking probability corresponding to the first data flow, wherein the level of the target queue is related to the length of the target queue.

7. The method of claim 6, wherein the determining, based on at least one of the target parameter and the level of the first data flow and at least one of the length and a level of the target queue, the marking probability corresponding to the first data flow comprises:

determining, based on the level of the first data flow and the length of the target queue, the marking probability corresponding to the first data flow, wherein if the level of the first data flow remains unchanged, when a marking probability determined based on a second queue length is greater than a marking probability determined based on a first queue length, the second queue length is greater than the first queue length.

8. The method of claim 6, wherein the determining, based on at least one of the target parameter and the level of the first data flow and at least one of the length and a level of the target queue, the marking probability corresponding to the first data flow comprises:

determining, based on the level of the first data flow and the level of the target queue, the marking probability corresponding to the first data flow, wherein if the level of the first data flow remains unchanged, when a marking probability determined based on a second queue level is greater than a marking probability determined based on a first queue level, the second queue level is greater than the first queue level.

9. The method of claim 6, wherein the determining, based on at least one of the target parameter and the level of the first data flow and at least one of the length and a level of the target queue, the marking probability corresponding to the first data flow comprises:

determining, based on the target parameter and the level of the first data flow and the length and the level of the target queue, the marking probability corresponding to the first data flow, wherein when both the level of the first data flow and the level of the target queue remain unchanged, a relationship between the marking probability corresponding to the first data flow, the target parameter of the first data flow, and the length of the target queue meets at least one of the following:

if the target parameter of the first data flow remains unchanged, the marking probability corresponding to the first data flow increases as the length of the target queue increases; if the length of the target queue remains unchanged, the marking probability corresponding to the first data flow increases as the target parameter of the first data flow increases; if the target parameter of the first data flow remains unchanged, the marking probability corresponding to the first data flow remains unchanged as the length of the target queue increases; and if the length of the target queue remains unchanged, the marking probability corresponding to the first data flow remains unchanged as the target parameter of the first data flow increases.

10. The method of claim 6, wherein when a second queue level related to a second queue length is greater than a first queue level related to a first queue length, the second queue length is greater than the first queue length.

11. The method of claim 10, wherein the length of the target queue falls within one of a plurality of length ranges, the plurality of length ranges are in a one-to-one correspondence with a plurality of queue levels, and the level of the target queue is a queue level that is in the plurality of queue levels and that corresponds to one length range.

12. The method of claim 1, wherein the determining, based on at least one of the target parameter and the auxiliary parameter of the first data flow, the marking probability corresponding to the first data flow comprises:
determining, based on at least one of the target parameter and the level of the first data flow and at least one of a transmission rate of the first data flow and a transmission rate level of the first data flow, the marking probability corresponding to the first data flow, wherein
the transmission rate level of the first data flow is related to the transmission rate of the first data flow.

13. A data packet marking device, comprising:
a memory storing executable instructions;
a processor configured to execute the executable instructions to perform operations of:
collecting statistics about a target parameter of a first data flow, wherein a target queue of a switching device is used to buffer a data packet in the first data flow, wherein the target parameter is used to reflect an amount of data in the first data flow;
when a length of the target queue meets a first length condition, determining, based on at least one of the target parameter and an auxiliary parameter of the first data flow, a marking probability corresponding to the first data flow; and
performing congestion marking on a data packet in the first data flow based on the marking probability corresponding to the first data flow,
wherein the auxiliary parameter of the first data flow is related to the target parameter of the first data flow, the auxiliary parameter comprises a level of the first data flow,
wherein the target parameter of the first data flow falls within one of a plurality of target parameter ranges, the plurality of target parameter ranges are in a one-to-one correspondence with a plurality of data flow levels, and the level of the first data flow is a data flow level that is in the plurality of data flow levels and that corresponds to one target parameter range.

14. The device of claim 13, wherein determining the marking probability corresponding to the first data flow comprises:
determining, based on the target parameter of the first data flow, the marking probability corresponding to the first data flow, wherein
when a marking probability determined based on a second target parameter is greater than a marking probability determined based on a first target parameter, the second target parameter is greater than the first target parameter.

15. The device of claim 13, wherein determining the marking probability corresponding to the first data flow comprises:
determining, based on the level of the first data flow, the marking probability corresponding to the first data flow, wherein
when a marking probability determined based on a second flow level is greater than a marking probability determined based on a first flow level, the second flow level is greater than the first flow level.

16. The device of claim 13, wherein determining the marking probability corresponding to the first data flow comprises:
determining, based on the target parameter and the level of the first data flow, the marking probability corresponding to the first data flow, wherein
when the level of the first data flow remains unchanged, the marking probability corresponding to the first data flow increases as the target parameter of the first data flow increases, or the marking probability corresponding to the first data flow remains unchanged as the target parameter of the first data flow increases.

17. A non-transitory computer-readable storage medium having program instructions stored therein, which cause a processor to perform operations, the operations comprising:
collecting statistics about a target parameter of a first data flow, wherein a target queue of a switching device is used to buffer a data packet in the first data flow, wherein the target parameter is used to reflect an amount of data in the first data flow;
when a length of the target queue meets a first length condition, determining, based on at least one of the target parameter and an auxiliary parameter of the first data flow, a marking probability corresponding to the first data flow; and
performing congestion marking on a data packet in the first data flow based on the marking probability corresponding to the first data flow,
wherein the auxiliary parameter of the first data flow is related to the target parameter of the first data flow, the auxiliary parameter comprises a level of the first data flow,
wherein the target parameter of the first data flow falls within one of a plurality of target parameter ranges, the plurality of target parameter ranges are in a one-to-one correspondence with a plurality of data flow levels, and the level of the first data flow is a data flow level that is in the plurality of data flow levels and that corresponds to one target parameter range.

* * * * *